March 9, 1965 C. M. RIVELY ETAL 3,172,455
METHOD OF MANUFACTURE FOR SYNCHRONIZING
MOVEMENT BETWEEN PLURAL WORKLINES
Original Filed Jan. 15, 1959 20 Sheets-Sheet 1
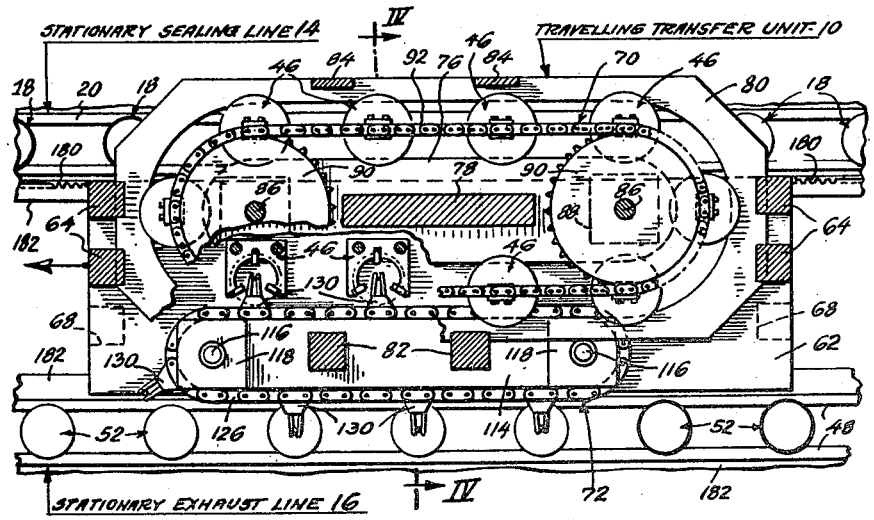
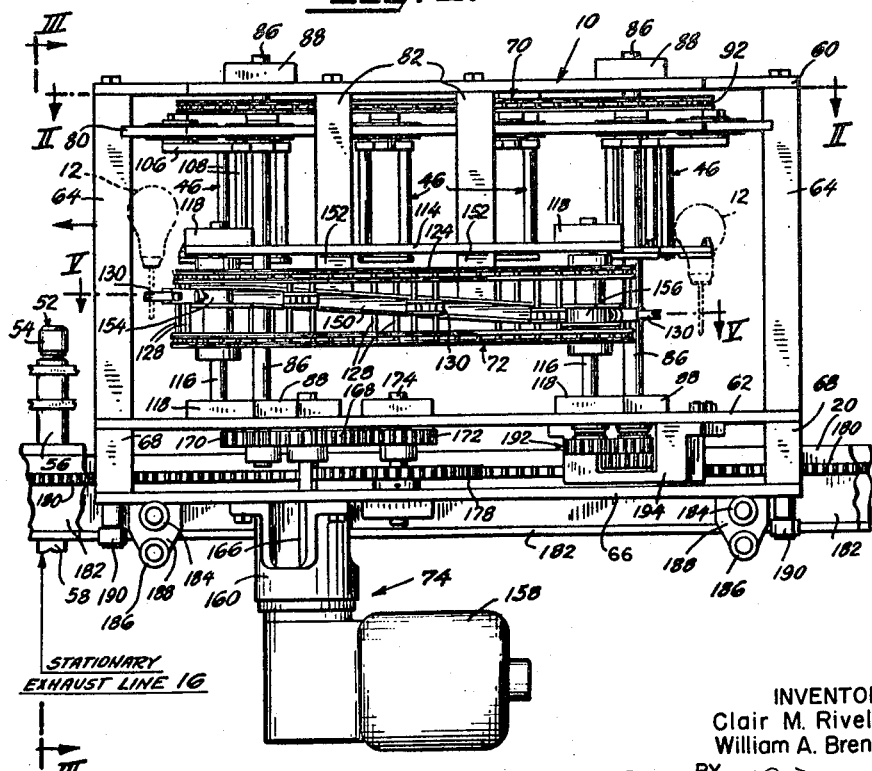
INVENTORS
Clair M. Rively and
William A. Brenneck.
BY
ATTORNEY

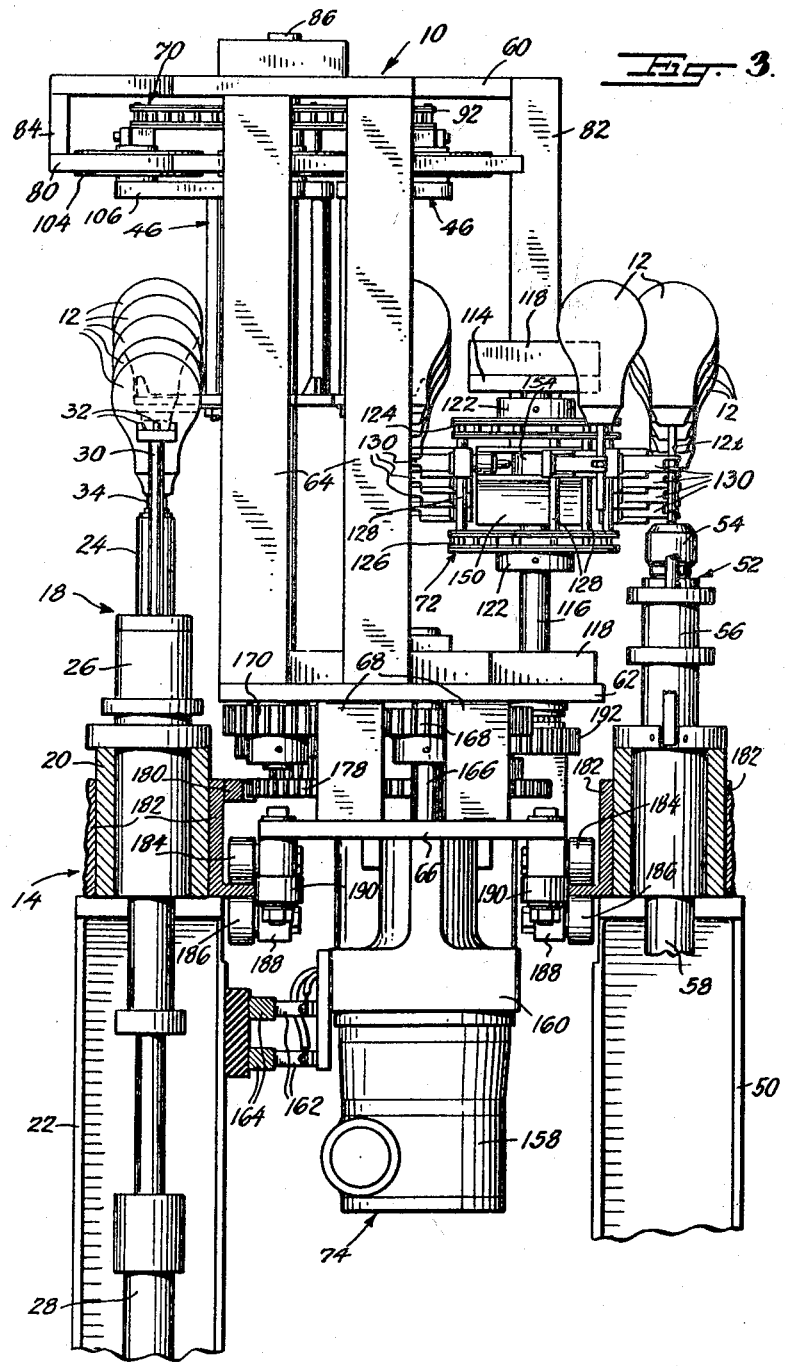

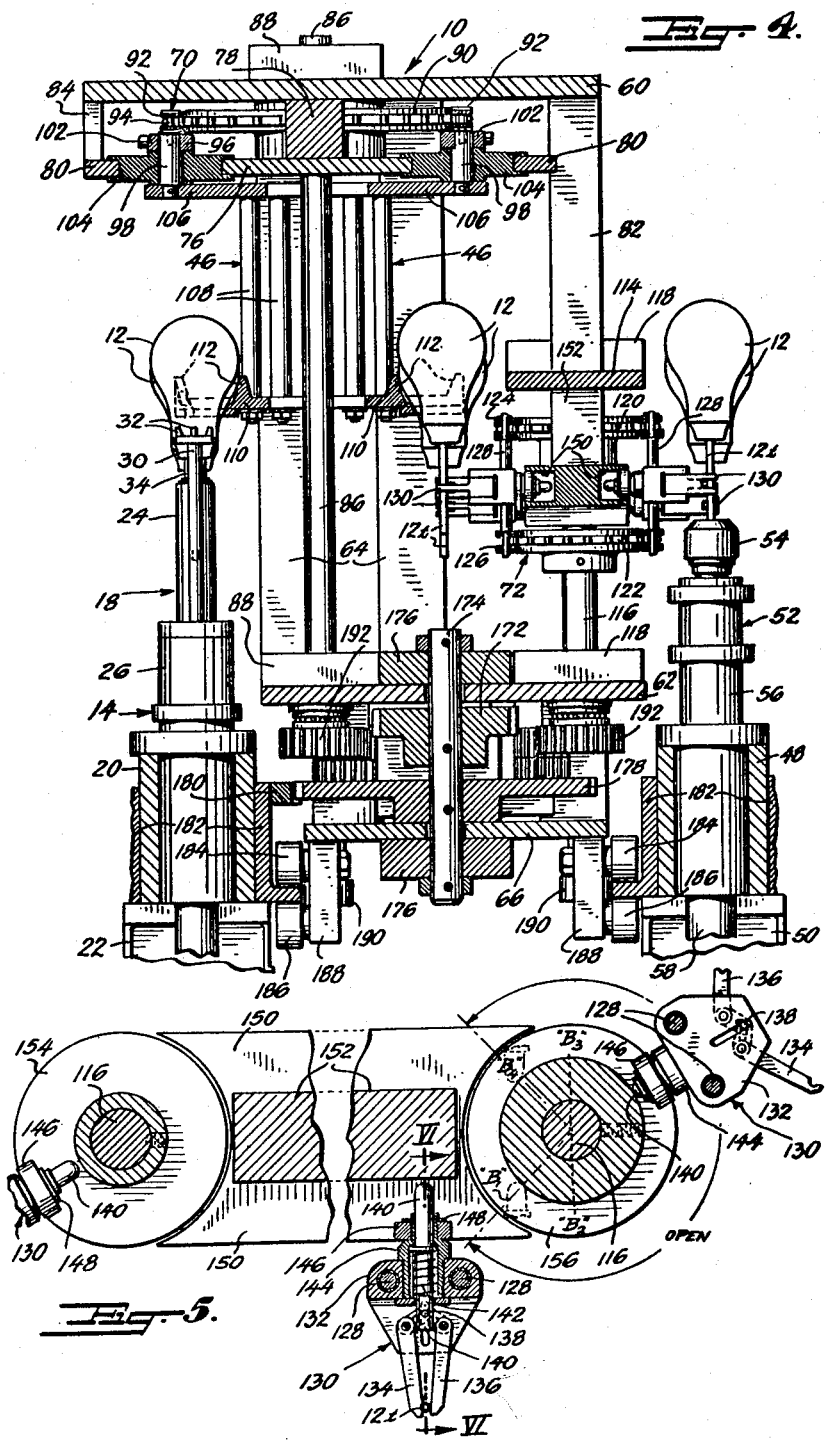

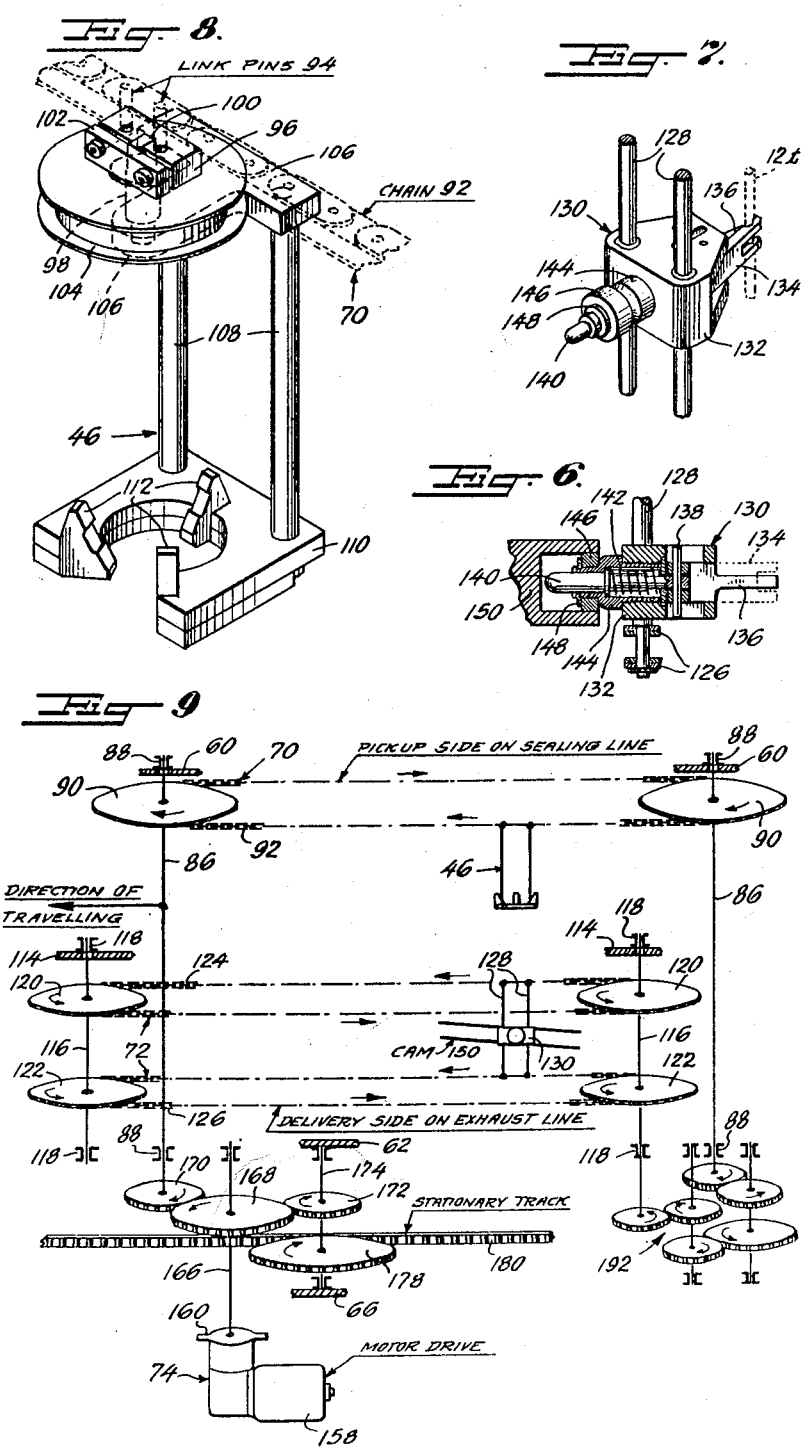

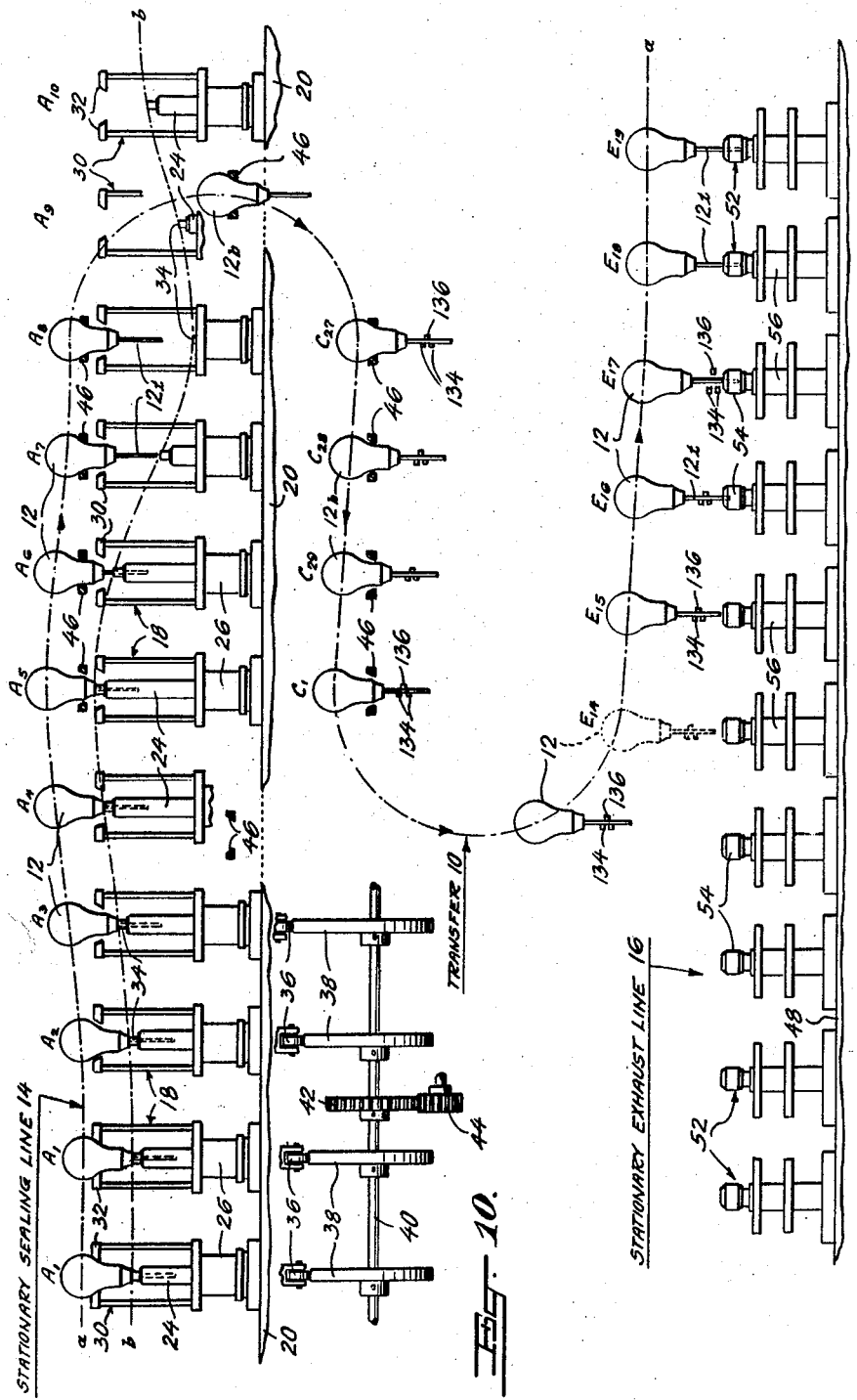

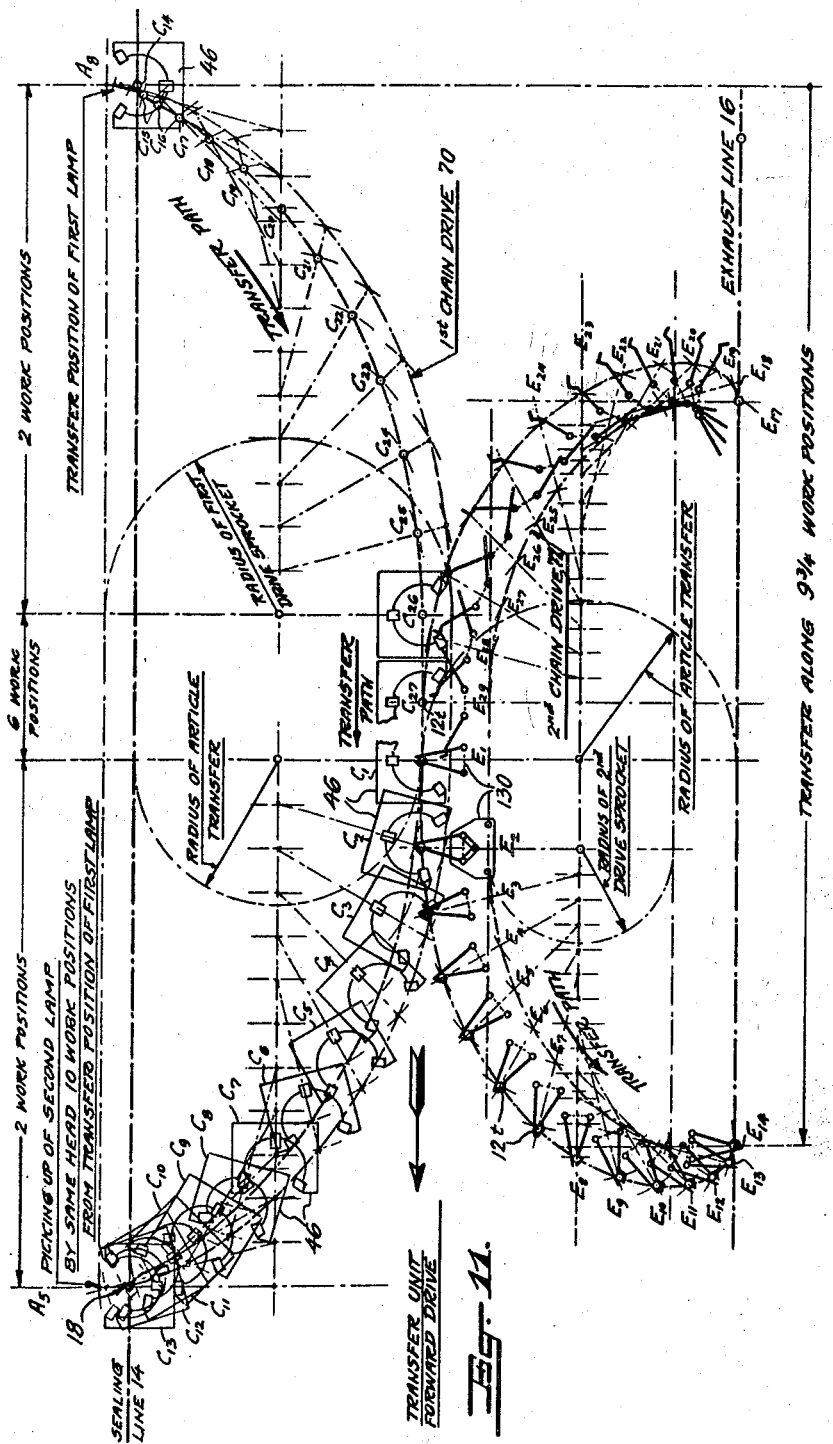

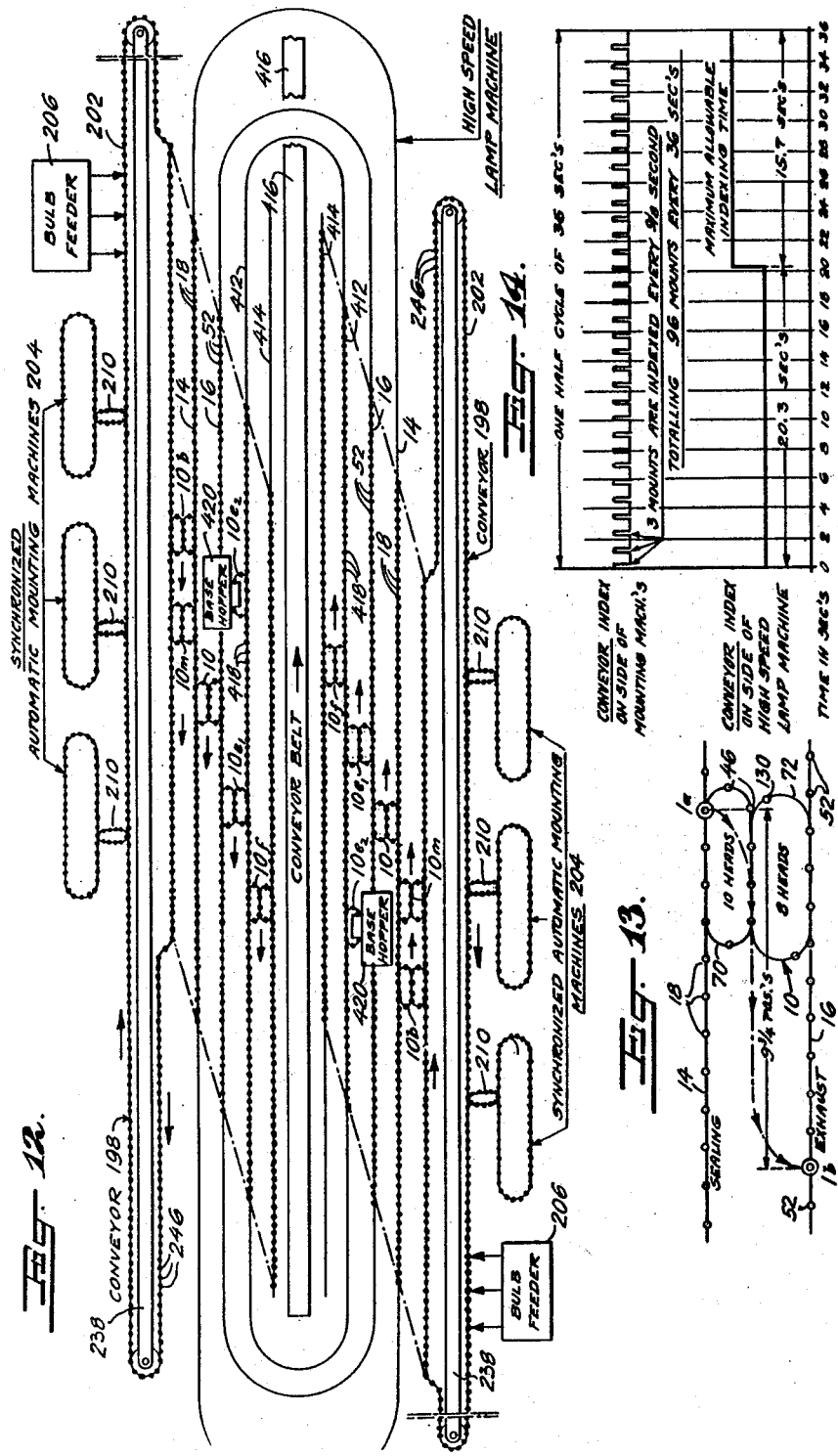

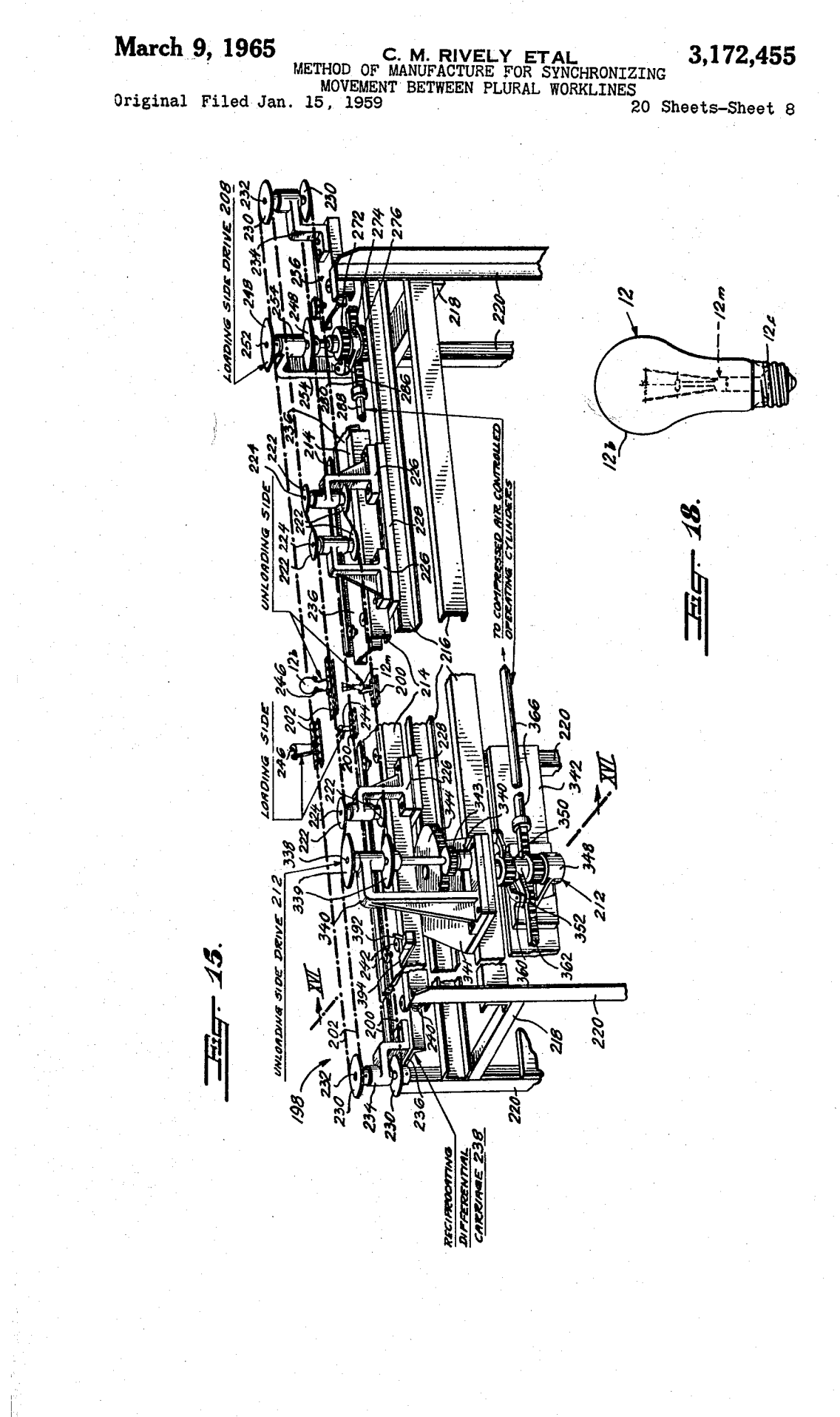

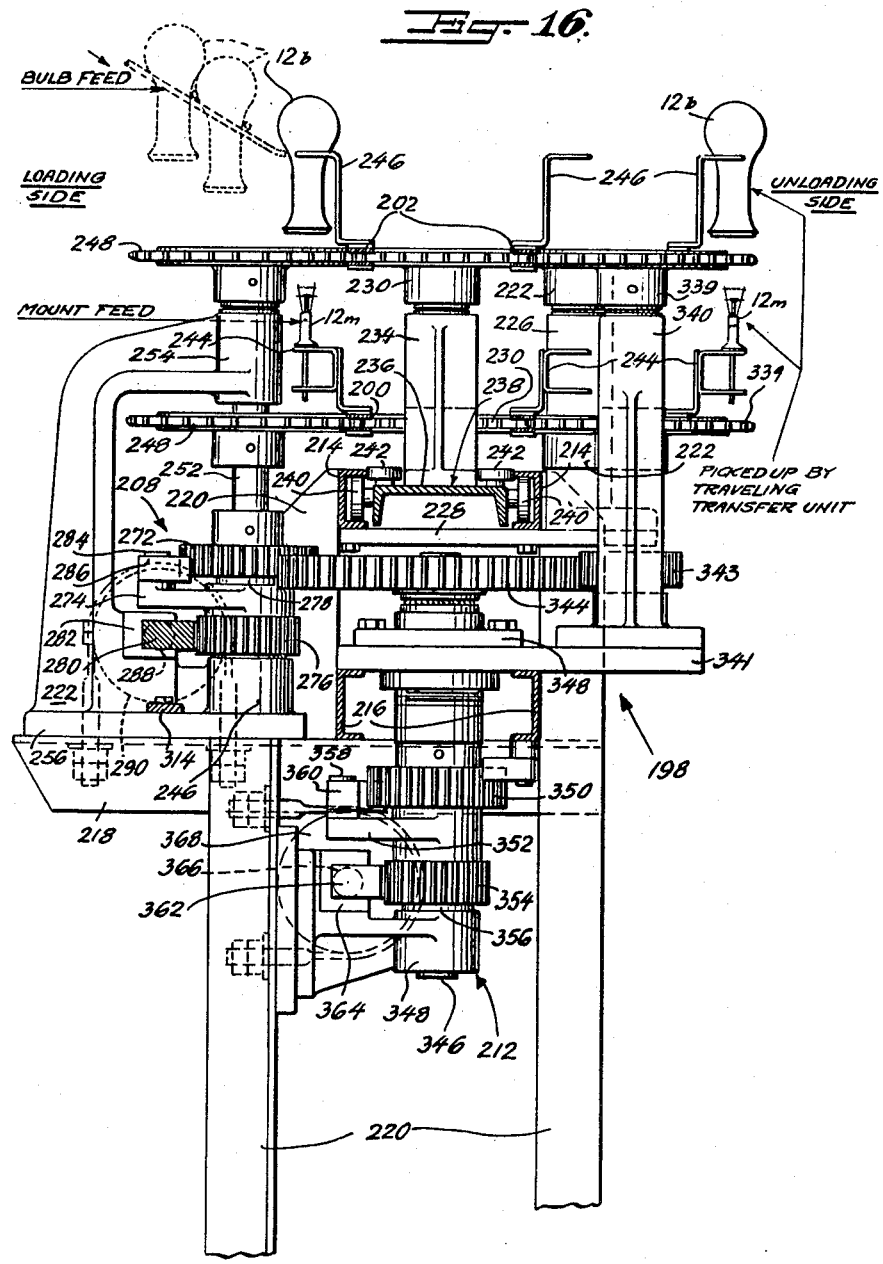

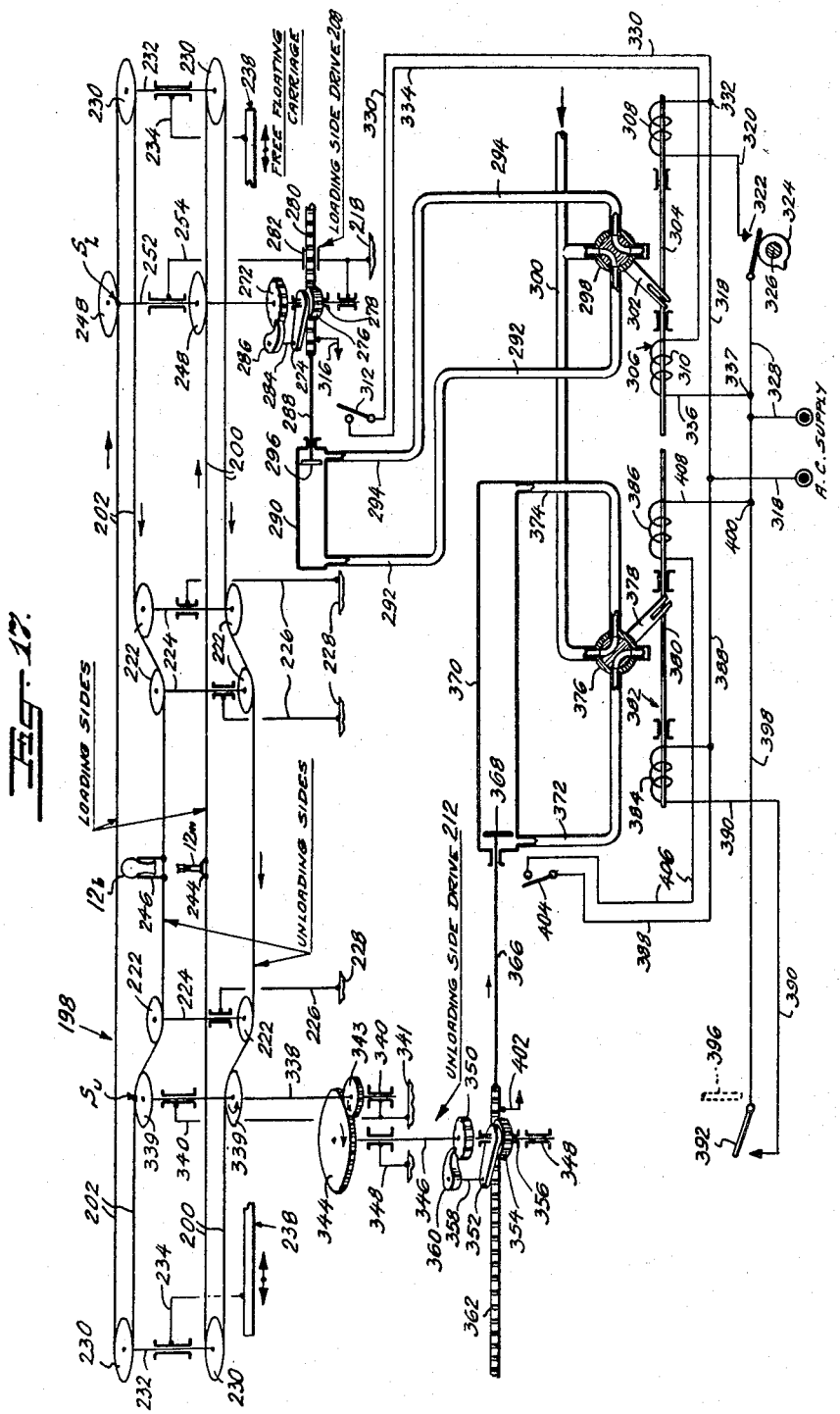

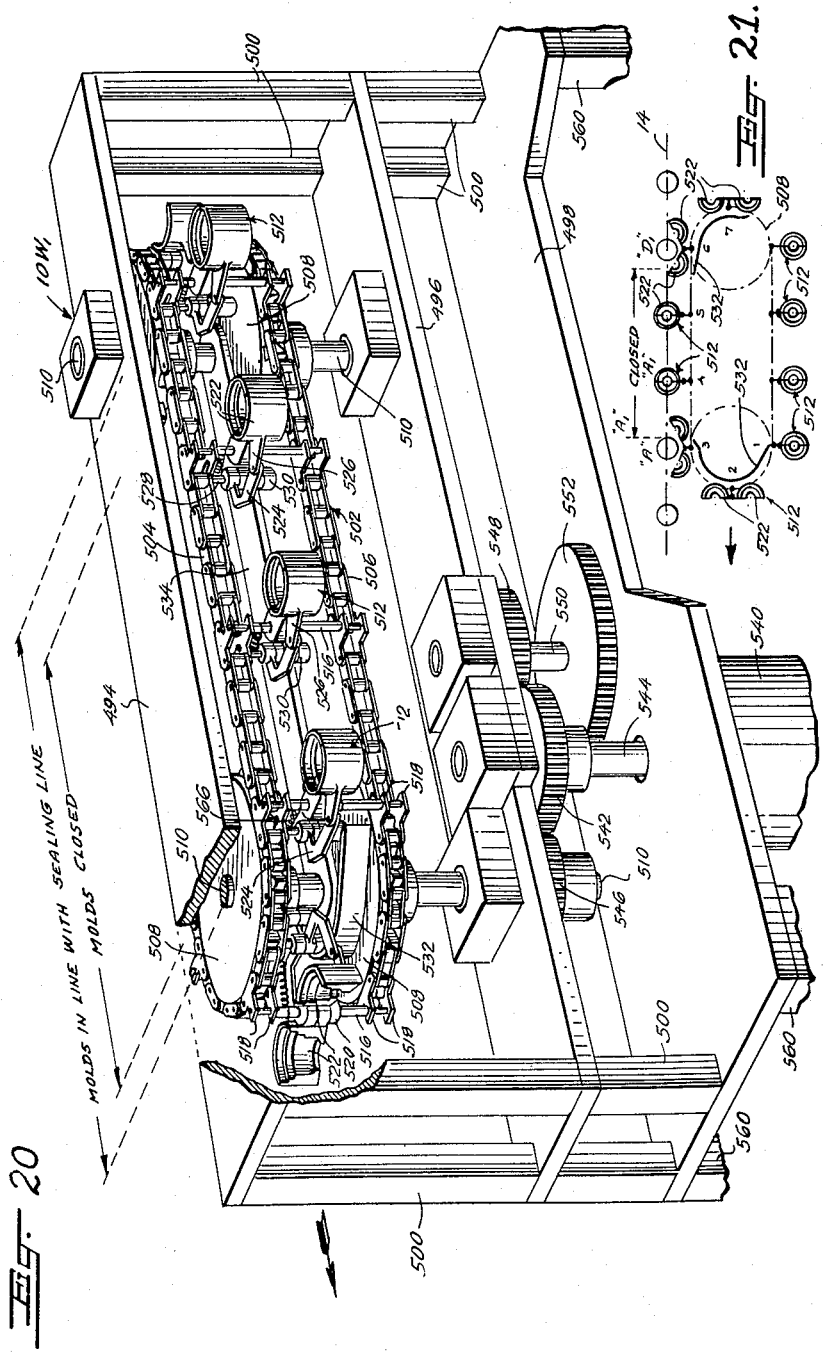

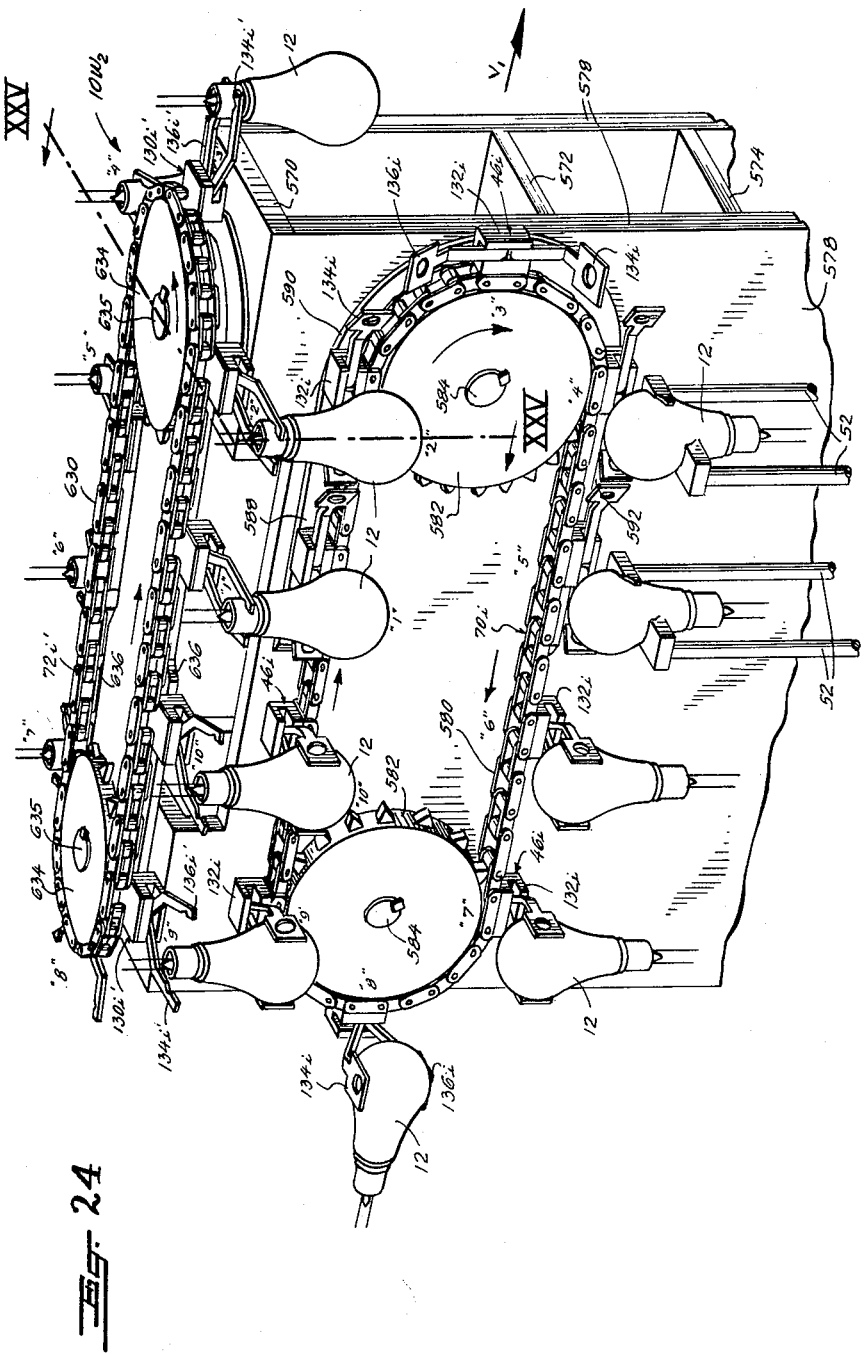

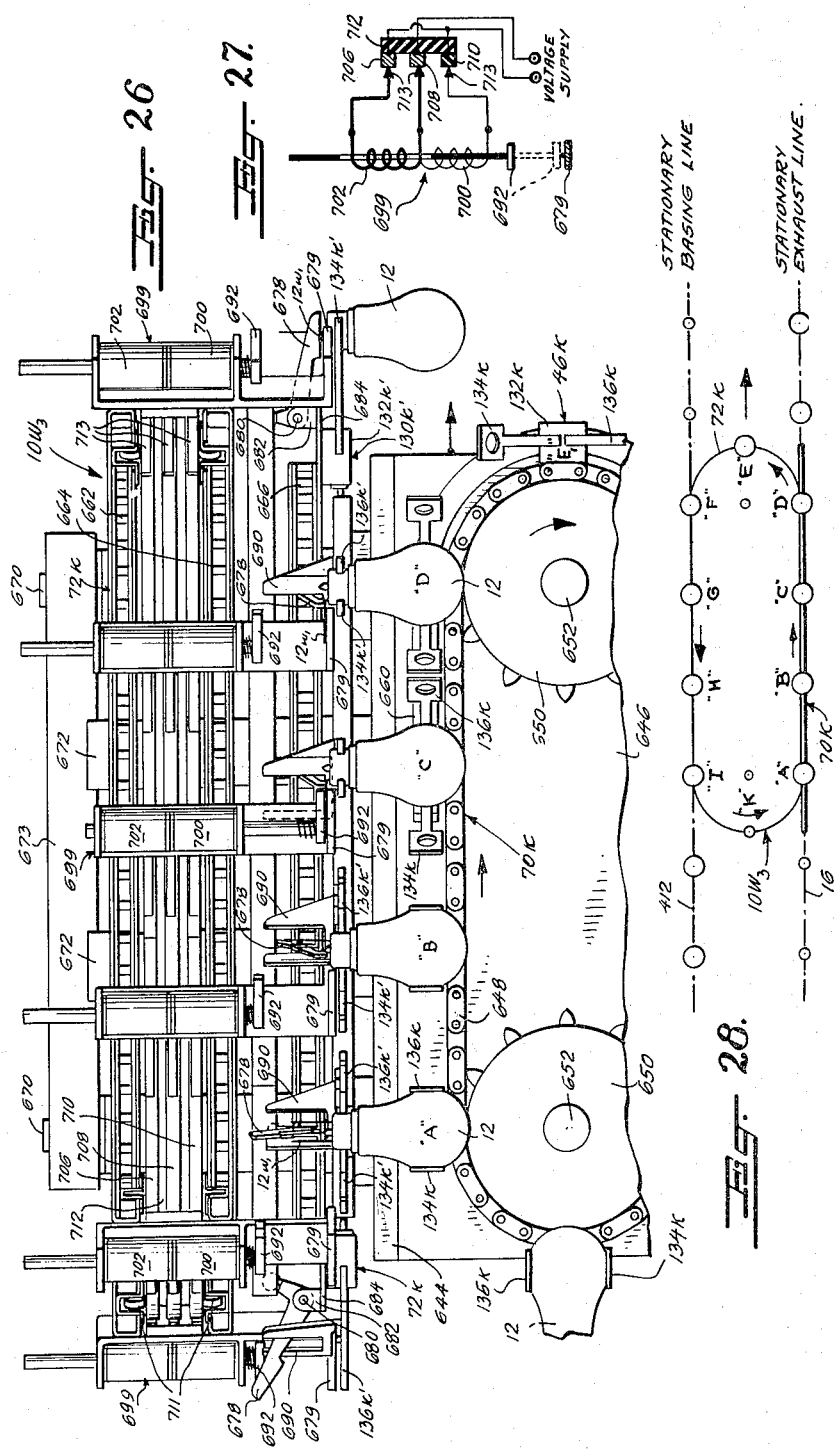

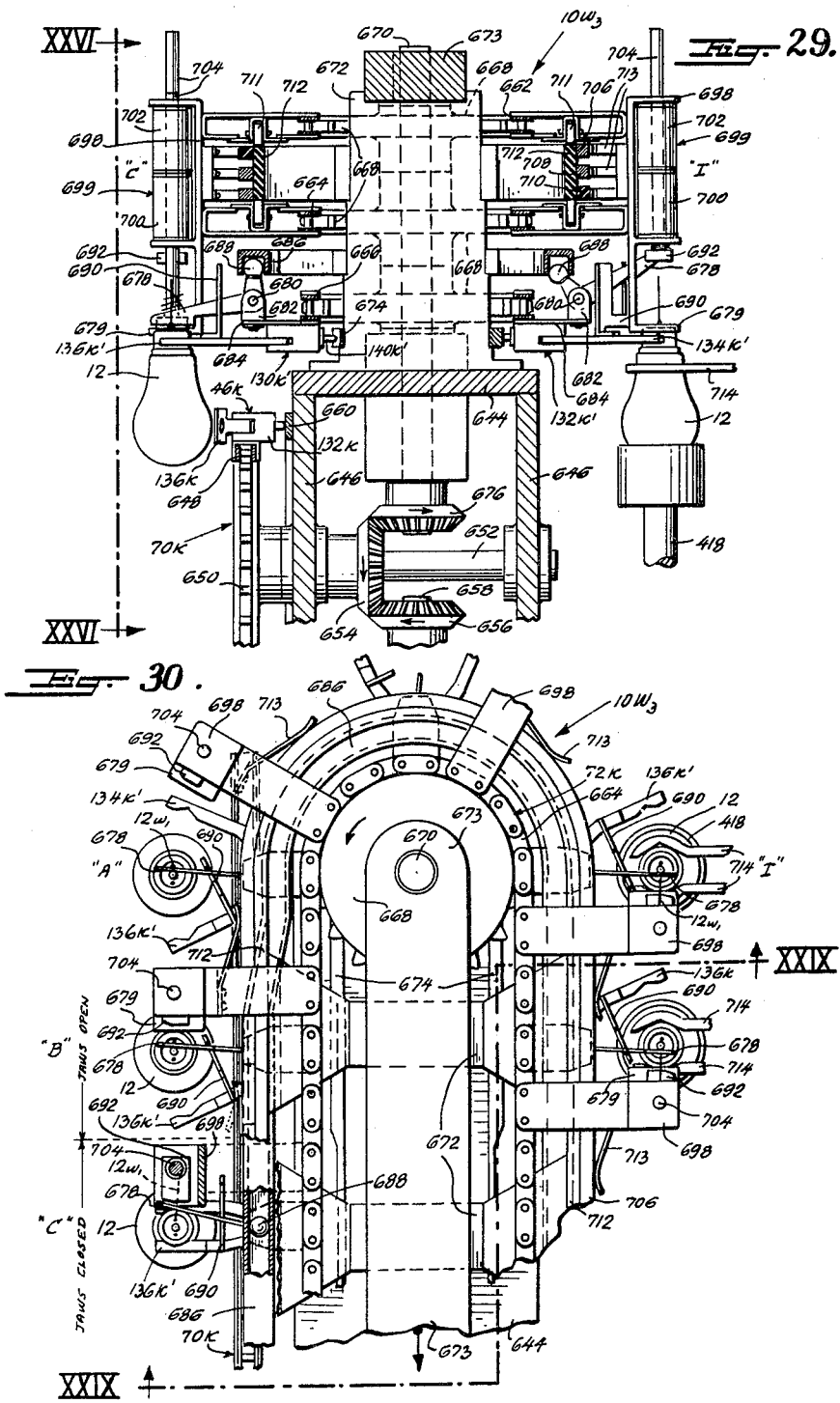

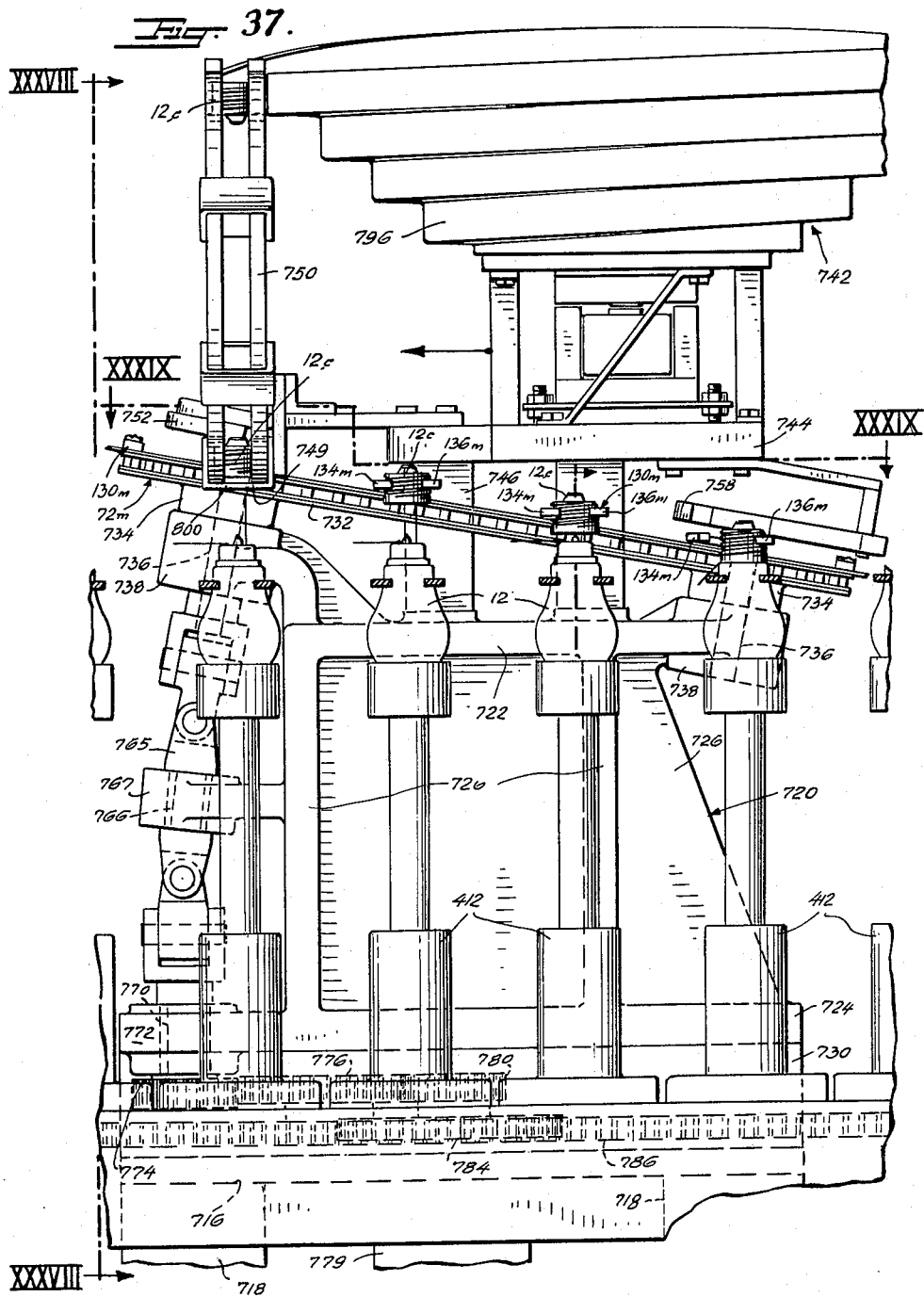

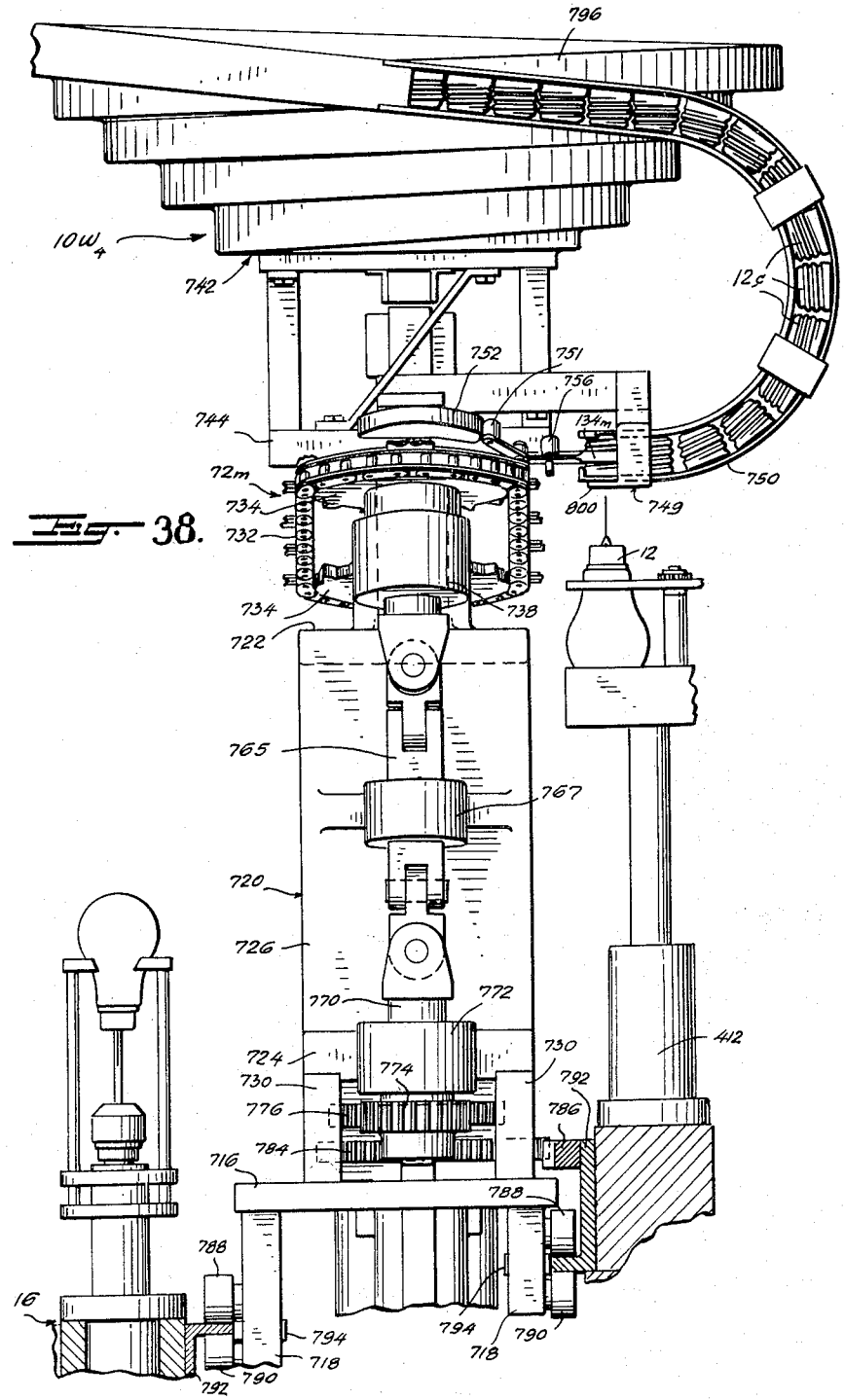

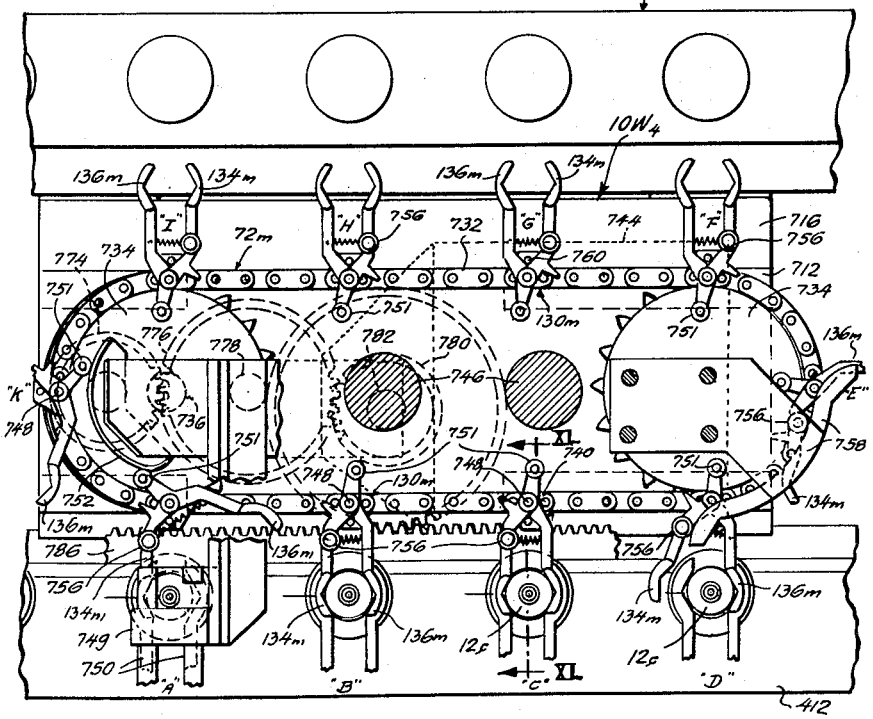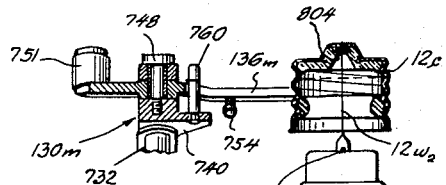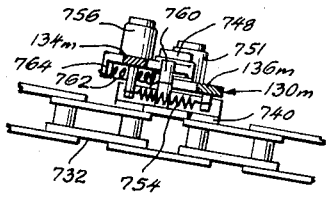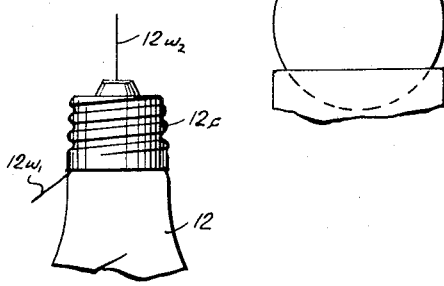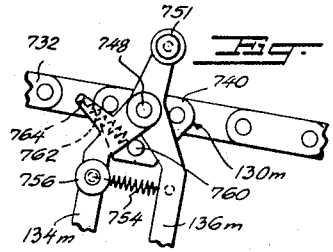

United States Patent Office 3,172,455
Patented Mar. 9, 1965

3,172,455
METHOD OF MANUFACTURE FOR SYNCHRO-
NIZING MOVEMENT BETWEEN PLURAL
WORKLINES
Clair M. Rively, Rockaway, and William A. Brenneck,
West Caldwell, N.J., assignors to Westinghouse Electric Corporation, East Pittsburgh, Pa., a corporation of
Pennsylvania
Original application Jan. 15, 1959, Ser. No. 787,059, now
Patent No. 3,129,043, dated Apr. 14, 1964. Divided
and this application Feb. 23, 1960, Ser. No. 15,785
14 Claims. (Cl. 153—10)

This application is a division of application Serial No. 787,059, filed January 15, 1959, to Clair M. Rively et al. for Automatic Manufacturing Machine and now Patent No. 3,129,043.

The present invention relates to the manufacture of a product produced by the assembly of the individual parts and, more particularly, to such manufacture of incandescent lamps, discharge devices, electronic tubes and the like and concerns itself with methods of manufacture.

Heretofore the manufacture of incandescent lamps, discharge devices and electronic tubes has been practiced with a group of conventional machines comprising generally a mounting machine, a sealing and exhausting machine and a basing machine, which group employs on the average about three operators and requires vast areas of floor space, such as about 600 sq. ft. These conventional machines transfer the work pieces or subassemblies from work station to work station either intermittently, as by indexing, or continuously. Further, when maintenance is required for a particular head of one of these machines, that machine must be shut-down, thus incapacitating the entire group during the maintenance period. In addition, conventional machines due to their rotating motion and their relatively large weight are limited by the factors of momentum and inertia to index speeds of 3000 to 3600 units per hour. Due to the stresses produced in these conventional machines during their operation and the limits of current engineering materials these production figures represent the maximum rates for a group of such machines. A further limitation in the case of the sealing and exhausting machines, is the use of a sliding rotary valve which limits the index time and hence the production rate to the minimum exhaust time required per head per exhaust station.

It is accordingly the general object of the present invention to avoid and overcome the foregoing and other difficulties of and objections to the prior art practices by the provision of a method for the high-speed manufacture of any product produced by the assembly of the individual parts and capable of production rates in the neighborhood of 18,000–22,000 units per hour.

A further object of the present invention is to provide such a method which lends itself to practice with manufacturing apparatus which is readily maintained without lengthy shut-down periods.

Another object of the present invention is to provide such a method which requires a minimum number of operators and considerably less floor space than heretofore required to produce an equivalent number of lamps.

The aforesaid objects of this invention and other objects, which will become apparent as the description proceeds, are achieved in the practice of this invention with an automatic high-speed manufacturing machine which first produces a plurality of sub-assembly articles at a predetermined rate. These articles are loaded in the heads of a first line. In the practice of a specific aspect of this invention the articles are picked up and transferred to a second line and successively to further lines for further processing by a transfer unit which moves between the lines and has pick-up means which is moved so that it is at rest relative to the lines during a portion of its motion. In accordance with a further specific aspect of this invention the transfer unit may carry tools in lieu of, or in addition to, pick-up units which move between lines and carry out operations on the articles during the intervals when the tools are at rest relative to the lines. After completion the articles are removed by a transfer unit from the last work line and packed ready for shipment.

The movement of the pick-up means so that it is at rest relative to the lines during transfer or an operation is achieved by imparting two components of velocity to the pick-up means: one component is imparted by the movement of the transfer unit itself; the other component is imparted by the movement of the pick-up means relative to the unit. These components are so related in magnitude and direction that their resultant is zero relative to the lines when the pick-up means is along the lines. The word "velocity" here and in the claims is used to designate a vector and not a scalar quantity. "Velocity" as used here then has the attributes of direction and magnitude. Two velocities on a body which are of the same magnitude and of opposite directions at a point in the path of a body cause the body to remain at rest at the point.

For a better understanding of the invention reference should be had to the accompanying drawings wherein:

FIG. 1 is a side-elevational view of a compound transfer unit and a stationary lamp-exhaust line having a portion partially broken away to show the entire transfer unit.

FIG. 2 is a horizontal-sectional view of the transfer unit along the line II—II of FIG. 1 in the direction of the arrows and showing the associated stationary lamp-sealing and exhaust lines.

FIG. 3 is an enlarged end-elevational view of the transfer unit along the line III—III of FIG. 1 in the direction of the arrows and showing the associated stationary lamp-sealing line on the left, the stationary lamp-exhaust line on the right and the details of the drive mechanism for the transfer unit.

FIG. 4 is a vertical-sectional view of the transfer unit and associated stationary lamp-sealing line and lamp-exhaust line along the line IV—IV of FIG. 2 in the direction of the arrows and showing the drive mechanism for the pick-up conveyor and discharge conveyor, which form a part of the transfer unit, and their respective article-carrying heads.

FIG. 5 is an enlarged fragmentary horizontal-sectional view of the discharge conveyor of the transfer unit taken along the line V—V of FIG. 1 looking in the direction of the arrows and showing a discharge head in the closed position about ready to open for the discharge of an article and another discharge head in the open position after discharge.

FIG. 6 is a vertical-sectional view of a discharge head of the discharge conveyor taken along the line VI—VI of FIG. 5 looking in the direction of the arrows and showing the discharge head in the closed position, about ready to open, a portion of a cam track for the discharge head and the details of the discharge head.

FIG. 7 is a perspective view of a discharge head of the discharge conveyor of the transfer unit and its associated guide rods.

FIG. 8 is a perspective view of a pick-up head of the pick-up conveyor and a portion of the head-carrying movable member.

FIG. 9 is a diagrammatic perspective view of the drive mechanism for the transfer unit, the pick-up conveyor and the discharge conveyor and showing, for the sake of simplicity, only one pick-up head and one discharge head.

FIG. 10 is a diagrammatic operational view of the successive positions of an article, such as a lamp, during its transfer by the transfer unit from a stationary head on the lamp-sealing line to a stationary head on the lamp-exhaust line and showing the path of movement and vertical displacement of the lamp and a sealing spindle during the lamp transfer operation.

FIG. 11 is a diagrammatic plan view of the curtate-cycloid path of movement of a pick-up head from the transfer position of an article from a first sealing head into alignment with a discharge head to permit the transfer of an article to the discharge head while aligned therewith and its further curtate cycloid path of movement into alignment with a second sealing head; the prolate cycloid path of movement of a discharge head with the transferred article into alignment with an exhaust head to permit the transfer of the article to an exhaust head while aligned therewith and its similar path of movement into alignment with another pick-up head.

FIG. 12 is a diagrammatic plan view of the automatic high-speed lamp manufacturing machine employing the transfer units between successive stationary lines of operation and a transfer conveyor for transferring sub-assemblies, such as lamp mounts, from a plurality of automatic mounting machines and lamp bulbs from feeder devices, to two of the transfer units and showing the complete manufacturing operation from mounting to packing.

FIG. 13 is a diagrammatic plan view of the transfer of an article, such as a lamp, from a sealing head on the stationary sealing line to an exhaust head on the stationary exhaust line and showing the relative longitudinal displacement of the article during transfer.

FIG. 14 is a diagrammatic plan view of the intermittent operation of both sides of the transfer conveyor between the automatic mounting machines and bulb feeders and the transfer units.

FIG. 15 is a perspective view of the transfer conveyor which because of its length has been broken away along its mid-portions.

FIG. 16 is a vertical-sectional view of the transfer conveyor taken along the line XVI—XVI of FIG. 15 looking in the direction of the arrows, and showing the bulb conveyor, the mount conveyor and the associated drive mechanism therefor.

FIG. 17 is a diagrammatic perspective view of the drive mechanism for the transfer conveyor and showing the associated drive means and electrical circuits.

FIG. 18 is a side-elevational view of a finished lamp manufactured on the automatic high-speed manufacturing machine.

Figure 19:
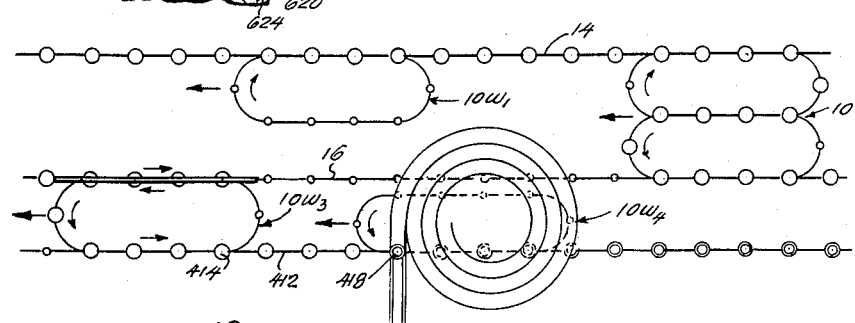

FIG. 19 is a diagrammatic plan view, similar to FIG. 12, of a further alternative embodiment of the automatic high-speed machine shown in FIG. 12, wherein work units, similar in structure to the compound transfer unit of FIGS. 1 and 2 and a simplex transfer unit of which has only one conveyor analogous to conveyors 70 or 72 of FIGS. 1 and 2 operating between two lines, have been provided by replacing the transfer heads with work tooling for the performance of short term work functions on the lamps secured in the work lines of such machine.

FIG. 20 is a perspective view of a seal-molding unit movable along the stationary sealing line to mold the sealed portions of the sealed lamps into a desired configuration.

FIG. 21 is a diagrammatic plan view showing the operation of the seal-molding unit and of the mechanism for opening and closing the molds.

Figure 23:
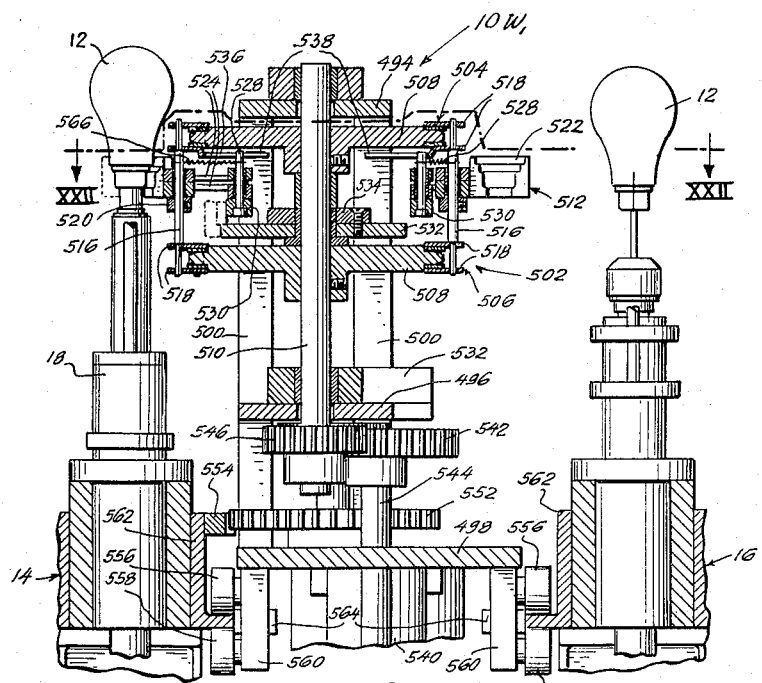
Figure 22:
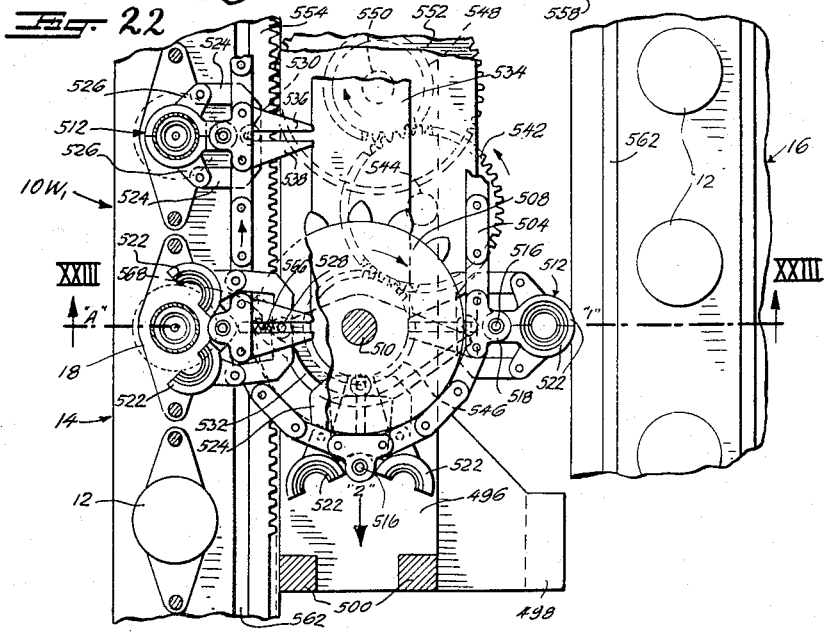

FIG. 22 is a fragmentary horizontal-sectional view of the left-hand end of the seal-molding unit, as viewed in FIG. 20, along the line XXII—XXII of FIG. 23 in the direction of the arrows and showing the details of the mold-opening and closing mechanism.

FIG. 23 is a vertical-sectional view of the seal-molding unit and the mold-operating mechanism along the line XXIII—XXIII— of FIG. 22 in the direction of the arrows.

FIG. 24 is a perspective view of the compound lamp-transfer and inverting unit utilized for picking up an exhausted lamp on the stationary exhaust line of the automatic high-speed machine of the present invention, inverting the exhausted lamp and transferring the same to a basing head on a stationary basing line of such machine.

Figure 25:
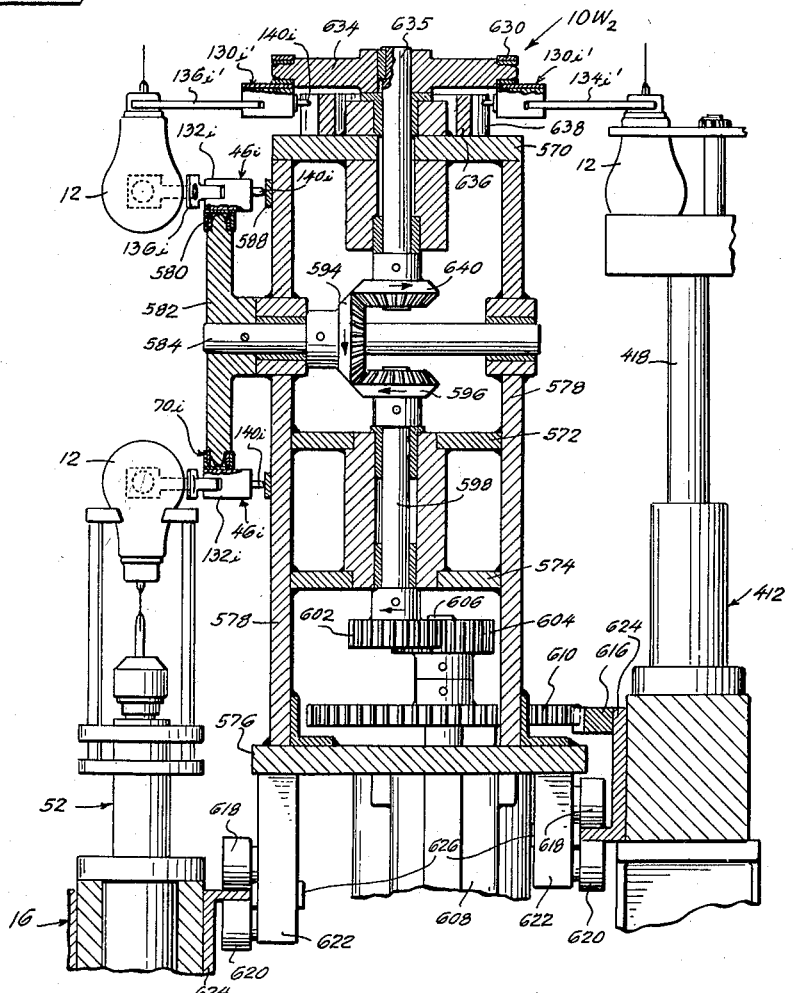

FIG. 25 is a vertical-sectional view of the compound lamp-transfer and inverting unit along the line XXV—XXV of FIG. 24 in the direction of the arrows.

FIG. 26 is a side-elevational view of the compound wire-bending and flattening unit taken along the line XXVI—XXVI of FIG. 29 in the direction of the arrows, which unit moves along the stationary exhaust line to pick up and invert an exhausted lamp, to bend and flatten the side-lead wire of such exhausted lamp, and to discharge the lamp into the stationary basing line.

FIG. 27 is a diagrammatic side-elevational view of the electrical means employed for operating a wire-flattening unit having a flattening hammer utilized in conjunction with an anvil to flatten the bent side-lead wire.

FIG. 28 is a diagrammatic plan view of the horizontally disposed discharge conveyor which transfers the inverted exhausted lamp from the pick-up conveyor to the stationary basing line and which carries the wire-bending device and wire-flattening unit associated with each discharge head.

FIG. 29 is an end-elevational view along the line XXIX—XXIX of FIG. 30 in the direction of the arrows and showing positions "C" and "I" of a discharge head on the bending, flattening and discharge conveyor.

FIG. 30 is a fragmentary plan view of positions "A," "B," "C" and "H" of a discharge head on the bending, flattening and discharge conveyor.

Figure 31:
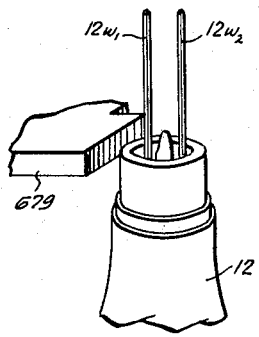

FIG. 31 is a fragmentary perspective view of an exhausted inverted lamp held in the pick-up and inverting conveyor (not shown) and aligned adjacent the stationary anvil carried by the bending, flattening and discharge conveyor.

Figure 32:
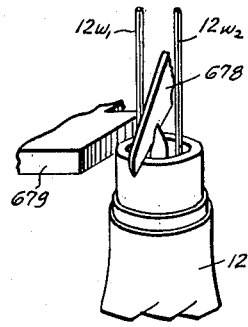

FIG. 32 is a view similar to FIG. 31 and showing the insertion of the side-lead-wire bending blade between the side-lead wire and the top-lead wire preparatory for the lateral swinging movement of such bending blade to bend such side-lead wire over the molded seal portion of the exhausted lamp and into position on the anvil.

Figure 33:
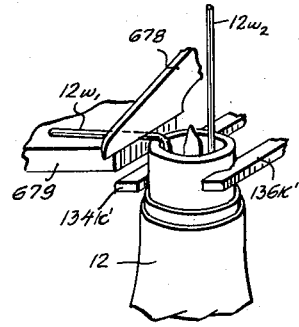

FIG. 33 is a view similar to FIGS. 31 and 32 and showing the discharge jaws about the molded seal of the exhausted lamp and the side-lead-wire bending blade in the bending position after the simultaneous gripping and bending operations have been performed by such discharge jaws and bending blade respectively.

Figure 34:
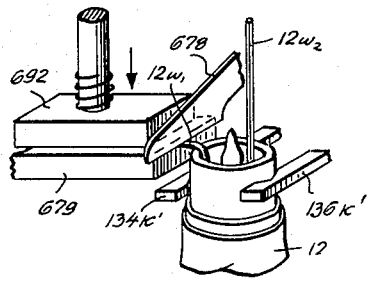

FIG. 34 is a view similar to FIGS. 31 through 33 and showing the flattening hammer in the "down" position where it flattens the bent side-lead wire against the anvil.

Figure 35:
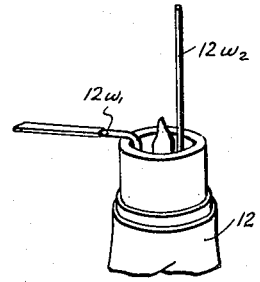

FIG. 35 is a view similar to FIGS. 31 through 34 and showing the bent, flattened side-lead wire.

Figure 36:
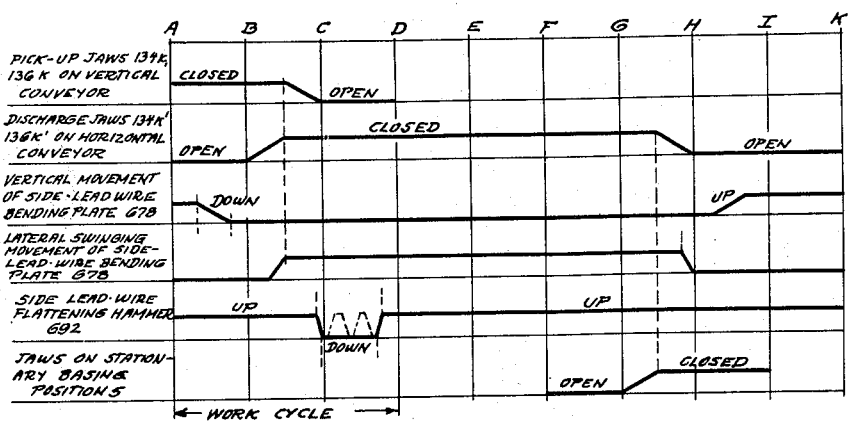

FIG. 36 is a diagrammatic view showing the sequence of operations of the pick-up jaws, side-lead-wire bending device, wire-flattening unit and discharge jaws at each of the ten operating positions.

FIG. 37 is a side-elevational view of the base-threading unit as it moves from right to left along the stationary basing line to thread an aligned base over the top-lead wire of an exhausted lamp positioned in such basing head.

FIG. 38 is an elevational view of the base-threading unit of FIG. 37 along the line XXXVIII—XXXVIII of FIG. 37 looking in the direction of the arrows and having the threading jaws removed from the movable member of the threading conveyor for the sake of clarity.

FIG. 39 is a plan view of the base-threading unit along the line XXXIX—XXXIX of FIG. 38 in the direction of the arrows.

FIG. 40 is a vertical-sectional view of a threading head at position "C" of FIG. 39 along the line XL—XL of FIG. 39, in the direction of the arrows.

FIG. 41 is an end view of the threading head shown in FIG. 42.

FIG. 42 is an enlarged fragmentary plan view of the threading head at position "C" of FIG. 39.

FIG. 43 is a fragmentary side elevational view of an exhausted lamp with a base threaded over the top-lead wire thereof and positioned on the molded-seal portion of such exhausted lamp by the base-threading unit of the present invention.

Although the principles of the invention are broadly applicable to the manufacture of any product which is produced by the assembly of the individual parts, the invention is particularly adapted to the manufacture of incandescent lamps and hence it has been so illustrated and will be so described.

With specific reference to the form of the invention illustrated in the drawings a compound transfer unit, generally indicated by the numeral 10 (FIGS. 1 to 13) has been shown which is operable to transfer articles, such as sealed lamps 12, from an article-feeding line, such as a stationary sealing line 14, to an article-receiving line, such as a stationary exhaust line 16, as said unit 10 moves therebetween from right to left, as viewed in FIG. 1.

Sealing line

To support a plurality of reciprocable heads 18 of the sealing line 14, for example ninety-six as shown in FIG. 12, a frame is provided which comprises a longitudinal channel 20 (FIG. 3) supported by legs 22, affixed to the bottom of the channel 20 at regular spaced intervals. As shown in FIG. 12, the tandem-type sealing line 14 may consist of two such longitudinal sealing portions of ninety-six heads 18 each spaced, for example, about six inches apart, which sealing portions are connected by rounded non-operating end portions.

In order to permit reciprocation of each of the heads 18 (FIGS. 3 and 4) a spindle 24 for each head 18 is reciprocable in an upper bearing 26 in the channel 20 and a lower bearing 28 upstanding from the floor. So that each head 18 may rotate, a bifurcated sealing-head bulb holder 30 (FIG. 10) is rotatably affixed to the upper portions of each of the upper bearings 26 and is provided with suitable fingers 32 adapted to support the bowl of a lamp 12. As is well known in the sealing art, each spindle 24 has a mount pin 34 (FIG. 3) on its upper end to position the flare of a lamp mount $12m$ (FIG. 18) during the sealing operation. To provide a reciprocating means for each spindle 24, the lower end of each spindle 24 carries a roller 36 (FIG. 10) for engagement with an individual cam 38 on a sealing-line cam shaft 40, which shaft 40 is driven by a gear 42 meshing with a pinion gear 44 affixed to the shaft of a motor (not shown).

During operation the cam 38 progressively raises the spindle 24 within a predetermined period of time so that, if the heads 18 were not in simultaneous horizontal motion (but remain horizontally stationary while the transfer unit 10 moves relative to the rising spindles 24, which is the case as hereinafter described), the effect of such progressive raising of the spindle 24 is that the end of the spindle 24 travels an imaginary path of movement, as indicated by the dotted line $b$ in FIG. 10. By the same token, since a sealed lamp 12 is cradled in the sealing-head holder 30, such lamp 12 is raised by the spindle 24 from the normal work position of the lamp in the holder 30, as shown at $A_1$ in FIG. 10, progressively through positions $A_2$ and $A_5$, and thence through positions $A_6$ to $A_8$, which would be equivalent to such lamp traversing an imaginary path of movement $a$ in FIG. 10, during the same period of time that the end of the spindle 24 moved through its imaginary path $b$.

When, however, the lamp 12 is raised by the spindle 24 to the position $A_5$, a pick-up head 46 carried by a conveyor of the transfer unit 10, as hereinafter more fully described, aligns itself with the sealing-head holder 30 and contacts the lamp 12 at the position $A_6$ so that the latter is supported by the transfer unit pick-up head 46, since the spindle 24 alone moves downwardly from positions $A_6$ to $A_8$ leaving the lamp 12 in the pick-up head 46. Finally, due to the relative movement of the pick-up head 46 with respect to the lamp holder 30, and after the spindle 24 has cleared the lamp tubulation $12t$ by moving below the latter, as shown in position $A_7$ (FIG. 10), the pick-up head 46 with the bulb $12b$ supported thereby moves away from its previous axial alignment with the sealing head bulb holder 30 and thus moves the lamp 12 through the opening in the bifurcated lamp holder 30. At the same time the spindle 24 moves upwardly through position $A_9$ and $A_{10}$ and returns to its initial work position $A_1$, as indicated by the line $b$ in FIG. 10.

To provide synchronized raising and lowering of successive spindles 24 both with respect to each other and the travel of the transfer unit 10, the raised portion of each cam 38 (FIG. 10) is offset a predetermined amount on the shaft 40 from the raised position of the preceding cam 38, as viewed in the direction of travel of the transfer unit 10.

Since the individual automatic tooling for sealing the mounts $12m$ (FIG. 18) to the bulbs $12b$ does not, per se, form a part of this invention it is sufficient to say that the bulbs $12b$ and flares of the mounts $12m$ are preheated, then heated to a semi-plastic condition to effect sealing thereof and finally the seals are molded to a desired contour for the later application of bases $12c$, in the conventional manner.

Exhaust line

The supporting structure for each longitudinal side of the tandem-type exhaust line 16 (FIGS. 1, 2, 3, 4, 10 and 12), similar in general structure to the sealing line 14, has a longitudinal channel 48 (FIG. 3) supported on a plurality of spaced legs 50 upstanding from the floor. A plurality of stationary exhaust heads 52, for example ninety-six in the showing of FIG. 12, are mounted on the channel 48 in the same spaced relation to each other as the sealing heads 18 on the sealing line 14, namely, about six inches apart. For the purpose of hermetically sealing a tubulation $12t$ in each head 52, a compression rubber assembly 54 of conventional structure, such as shown in U.S. Patent No. 2,254,905, issued September 2, 1941, to Daniel Mullan, is mounted on a hollow head housing 56 of each head 52 and the housing 56 is secured to the channel 48. So that a sealed lamp 12 may be alternately evacuated and gas filled during the exhaust thereof, an exhaust and gas fill line 58 connects the hollow interior of the housing 56 with a conventional valve (not shown) for alternately connecting said line 58 to a vacuum system or to a gas fill system (both not shown).

Since the individual automatic exhaust tooling for each head 52 does not, per se, form a part of this invention it is sufficient to say that the sealed lamps 12 in the heads 52 are subjected to the conventional exhaust steps comprising baking, alternately flushing and exhausting, final gas fill and tip off.

Transfer unit

In order to provide a frame for the compound transfer unit 10 (FIGS. 1–12) of the present invention, a top rectangular table 60 and an intermediate rectangular table 62 are integrated at their end portions (FIGS. 1 and 2) by a plurality of, for example four, upright vertical columns 64, and a lower rectangular table 66 is fixed in spaced relationship to the intermediate table 62 by a plurality of, for example four, spacers 68.

A pick-up conveyor or pick-up unit 70 and a discharge conveyor or discharge unit 72 of the compound transfer unit 10, as well as a drive mechanism 74 for the transfer unit 10 and the conveyors 70 and 72 are all operatively mounted on such frame of the transfer unit 10 as will now be more specifically described.

Pick-up conveyor

For the purpose of furnishing a supporting structure for the movable pick-up conveyor 70, which carries the pick-up heads 46 (FIGS. 1, 2, 3, 4, and 9), an inner guide 76 (FIG. 4) is suitably spaced below the top table 60 by a supporting spacer 78 depending from the table 60. An outer guide 80 is located in the same horizontal plane as the inner guide 76 (FIG. 4) and has its forward and rear end portions, as viewed in FIG. 2, mounted in suitable grooves in the columns 64. As shown in FIG. 4, the right-hand side portion of this outer guide 80, adjacent the exhaust line 16, is mounted in similar grooves in brackets 82 depending from the top table 60 while the other longitudinal side is supported by spacers 84 (FIGS. 2, 3 and 4) depending from top table 60. The guides 76 and 80 have, for convenience, the same general shape as the top table 60, with the latter guide 80 having angulated corners as shown in FIG. 2. In addition, the spacer 78 and the inner guide 76 are provided with a pair of clearance holes for vertical shaft 86 (FIGS. 1, 3 and 4) journalled in spaced relation in suitable bearings 88.

Each of the shafts 86 (FIG. 9) carries a guide member, such as a sprocket 90, and an endless movable member, such as a chain 92, passes around each sprocket 90 and is supported thereby. Such chain 92 carries the pick-up heads 46, which may be ten in number, as shown in FIGS. 2 and 13, with such heads 46 being adapted to pick up a sealed lamp 12 from a head 18 of the sealing line 14 as hereinbefore mentioned. To attach each of these pick-up heads 46 to the endless movable member 92, in the same spaced relation as the sealing heads 18, namely about six inches, a pair of link pins 94 (FIG. 8) in the chain 92 have their depending lower ends threadable into a block 96 on the pick-up head 46.

Pick-up heads

In order to permit each pick-up head 46 on the pick-up conveyor 70 (FIGS. 1, 4 and 8) to ride on the guides 76 and 80, a roller pin 98 has its block-like upper end portion, as viewed in FIG. 8, secured in a suitable slot 100 in the block 96, by a plate 102 affixed to the block 96, and such roller pin 98 carries a lipped guide roller 104 (FIGS. 4 and 8) which rides on the guides 76 and 80. To retain the roller 104 on the shaft 98, a T-shaped bracket 106 is affixed to the lower end of the shaft 98, as by pinning. For the purpose of providing each head 46 with lamp-receiving means, a pair of mount rods 108 depend from the bracket 106 and support a bulb-holder plate 110, on their lower end portions, which holder 110 is adapted by means of fingers 112 to receive a sealed lamp 12 from a head 18 of the sealing line 14 in the pick-up position $A_5$ (FIG. 10), as previously hereinmentioned.

Discharge conveyor

To afford mounting means for the discharge conveyor 72 of the transfer unit 10, a table 114 (FIGS. 1, 2, 3 and 4) is supported by the same bracket 82 depending from the top table 60 which also supports the guide member 80. This table 114 conveniently has a generally rectangular shape, as shown in FIG. 1. The movable portion of the discharge conveyor 72 has a pair of vertical shafts 116 (FIGS. 1–4 and 9) journalled in suitable bearings 118 mounted in the table 114 and intermediate table 62. Each shaft 116 carries an upper sprocket member 120 and a lower sprocket member 122 and endless movable members, such as chains 124 and 126, pass around these upper and lower sprocket members 120 and 122 respectively, and hence are movably supported thereby.

For the purpose of serving as guides for the mounting thereon of a plurality of vertically reciprocable discharge heads 130 (FIGS. 5, 6 and 7) of the discharge conveyor 72 in the same spaced relation at the pick-up heads 46, namely about six inches apart, common link pins 128 extend between the movable members. The heads 130 may be eight in number, as shown in FIGS. 2 and 13. It will be understood from a consideration of FIGS. 2 and 9 that contiguous parallel portions of the movable member 92 of the pick-up conveyor 70 and the movable members 124 and 126 of the discharge conveyor 72 move at the same rate and in the same direction, to permit the transfer of sealed lamps 12 from the pick-up heads 46 to the discharge heads 130.

Discharge heads

The discharge heads 130 carried by the discharge conveyor 72 each comprise a body 132 (FIGS. 5, 6 and 7) reciprocably movable along its associated pair of link pins 128 which pass through such body. A slot is formed in the outer side of such body 132 (FIGS. 5–7) and a pair of jaws 134 and 136 are pivotably mounted in the body slot with the outer ends of such jaws being adapted to normally close and grip the exhaust tubulation $12t$ of a sealed lamp 12. The inner end of these jaws 134 and 136 are engageable by a pin 138 carried by the inner end of a reciprocable plunger 140 extending through the inner side wall of the body 132. In order to maintain the outer end of the plunger 140 in its normally extended position (FIGS. 6 and 7), which position in turn keeps the jaws 134 and 136 closed through engagement of the pin 138 with the inner ends of such jaws, a coil spring 142 surrounds the plunger 140 where it passes through a bushing 144 provided in the body 132 and the spring 142 forces the plunger 140 outwardly of the body 132, as shown in FIGS. 5 and 7.

By reference to these latter figures, it will be noted that the means for raising and lowering each head 130 on the link pins 128 utilizes a roller 146 which surrounds the normally protruding end of the plunger 140 and is secured to the body 132 in any suitable manner, such as by a snap-ring 148. Such roller 146 of each discharge head 130 rides in a pair of cam tracks 150 supported by suitable brackets 152 depending from the table 114 (FIG. 1). These cam tracks 150 parallel the horizontal path of movement of the endless movable members 124 and 126 of the discharge conveyor 72 on each side of the axis of the shafts 116, but as can be seen from FIG. 1, such cam tracks 150 decline downwardly on each side of the axis of the shafts 116 from the upper endless member 124 toward the lower endless member 126. Hence, each discharge head 130 is at its highest elevation along the link pins 128 when at the upper left-hand end of the cam tracks 150, as viewed in FIGS. 1 and 5, being so raised or lowered by the roller 146 as it travels along the cam tracks 150 on each side of the axis of the left-hand shaft 116.

After the discharge head 130 reaches the top of the link pins 128, its integral roller 146 is then carried, by the endless movable members 124 and 126, from the far cam track 150 (as viewed in FIG. 1) into engagement with a grooved idler cam 154 (FIG. 5) affixed to the adjacent shaft 116. The roller 146 of each head 130 rides in the groove of this idler cam 154 during counterclockwise rotary movement (FIGS. 1 and 5) of the discharge head 130 about the common axis of the cam 154 and shaft 116 until such roller 146 again engages the highest elevation of the near cam track 150 (as viewed in FIG. 1). It will be noted particularly from FIG. 5, that the depth of the groove in the idler cam 154 is such that the discharge head plunger 140 is slightly spaced from the cam hub so that such plunger is in no way moved and hence the discharge head jaws 134 and 136 continue to remain closed about the tubulation 12t of a lamp 12 during the entire counterclockwise rotation (FIG. 5) of the discharge heads 130 about the periphery of the idler cam 154 and the axis of its drive shaft 116.

When the roller 146 of each discharge head 130 is carried by the continued movement of the discharge conveyor 72 into engagement with the highest elevation of the near cam track 150, as viewed in FIG. 1, such roller 146 rides down the declining surface thereof to insert the tubulation 12t into the exhaust head 52. At its lower elevation the roller 146 passes from the cam track 150 into the groove of another rotary cam 156 carried by the other shaft 116 of the discharge conveyor 72 and utilized to open the jaws 134 and 136. By reference now more particularly to FIG. 5, it will be noted that the inner hub portion of such rotary cam 156 is of much greater diameter than the hub portion of the idler cam 154. As the roller 146 traverses the periphery of this rotary cam 156, the end of the discharge head plunger 140 contacts such enlarged hub portion at the position "B$_1$" in FIG. 5, causing the beginning of an inward movement of such plunger 140 against the tension of the inner coil spring 142. When the plunger end reaches the position "B$_2$" of FIG. 5, it will be at the point of largest diameter of the hub portion of the rotary cam 156 and hence will then be entirely depressed into the discharge head 130, thus causing complete opening of the head jaws 134 and 136 which thus release the tubulation 12t of the lamp 12, leaving the latter in the exhaust head 52 into which it was deposited by the downward movement of the discharge head 130.

The head jaws 134 and 136 continue to remain open, as the empty discharge head 130 rotates counterclockwise (FIG. 5) about the periphery of the rotary cam 156 and the axis of its drive shaft 116, until the end of plunger 140 reaches point "B$_3$" in FIG. 5 where outward movement of the plunger 140 begins and is completed at position "B$_4$", at which time the head jaws 134 and 136 will have again closed about the tubulation 12t of another lamp 12 carried by the pick-up head 46 of the pick-up conveyor 70. As the pick-up heads 46 of the pick-up conveyor 70 and the discharge heads 130 of the discharge conveyor 72 move together at the same speed and in the same direction along a common path of movement (FIGS. 11 and 13), the elevating cam track 150 paralleling their path of movement and which is engaged by the head roller 146 raises the discharge head 130, as before mentioned, thus causing the latter to lift the lamp 12, by means of its tubulation 12t which is grasped by the head jaws 134 and 136, out of the pick-up head 46.

*Drive mechanism*

The prime mover for the drive mechanism 74 for the transfer unit 10 comprises an electric motor 158 supported on brackets 160 depending from the bottom table 66. As shown in FIG. 3, this motor 158 is energized from a suitable source of electrical energy to which it is connected by brushes 162 and bus bars 164 extending along the path of movement of the transfer unit 10. In order to utilize the motor 158 to cause movement of the transfer unit 10 between the sealing line 14 and the exhaust line 16, a drive shaft 166 of the motor 158 (FIGS. 3 and 9) extends through the bottom table 66 of the transfer unit 10 and carries a drive gear 168 meshing with a pinion gear 172 on an upright short shaft 174 journalled in suitable bearings 176 on the transfer unit 10 (FIG. 1). Such shaft 174 also carries a drive gear 178 engaging a stationary rack 180 affixed to a left-hand L-shaped guide track 182 (FIGS. 3 and 4) on the channel 20 of the sealing line 14, above the bus bars 164. A similar right-hand guide track 182 (FIG. 3) is also affixed to the channel 48 of the exhaust line 16 in horizontal alignment therewith.

To carry the weight of the transfer unit 10 and to keep it aligned with its path of movement, a pair of vertical rollers 184 and 186 are mounted on brackets 188 (FIG. 4) depending from each of the four corners of the bottom table 64. These pairs of rollers 184 and 186 engage the top and bottom surface, respectively, of the guide track 182 and eliminate vertical movement of the transfer unit 10. In order to prevent lateral movement of the transfer unit 10, a horizontal roller 190 (FIGS. 3 and 4), mounted adjacent each pair of rollers 184 and 186, engages the inner face of its respective guide track 182.

For the purpose of employing the motor 158 to also drive the pick-up conveyor 70 and the discharge conveyor 72, a pinion gear 170 on the forward shaft 86 (with reference to direction of movement, FIG. 1, of the pick-up conveyor 70) meshes with the drive gear 168. The clockwise rotation (FIG. 9) imparted to the forward shaft 86 by the drive gear 168 is transmitted by the guide sprockets 90 and movable endless member 92 to the rearward shaft 86 which in turn is connected by a gear train 192 to the rearward shaft 116, as viewed in FIG. 9, of the discharge conveyor 72. Such gear train 192 is contained in a gear box 194 (FIG. 1) affixed to the bottom of the intermediate table 62 of the transfer unit 10 and such gear train 92 is selected so that the adjacent sections of the movable endless member 92 of the pick-up conveyor 70 and the similar members 124 and 126 of the discharge conveyor 72 travel at the same rate and in the same direction, as hereinbefore mentioned.

*Operation of drive mechanism*

Upon energization of electric motor 158, the drive gear 168 is rotated in a counterclockwise direction which thereby rotates (FIG. 9) the gear 178 on the short shaft 174 in clockwise direction. Since this gear 178 engages the stationary rack 180, as previously mentioned, the transfer unit 10 moves to the left (FIGS. 1 and 2) along the guide tracks 182 between the stationary sealing line 14 and stationary exhaust line 16. At the same time counterclockwise rotation of the drive gear 168 rotates the pinion gear 170 on the forward shaft 86 (FIG. 1) of the pick-up conveyor 72 so that the sprocket members 90 and the rearward shaft 86 are in turn rotated in clockwise direction (FIG. 9). Such rotation of the rearward shaft 86 causes the above mentioned gear train 192 to rotate a pinion gear 196 on the rearward shaft 116 and the sprocket members 120 and 122 carried thereby in counterclockwise direction (FIG. 9).

It will thus be seen from FIGS. 2 and 9, that the side of the pick-up conveyor movable member 92 adjacent the sealing line 14, and the sides of the discharge conveyor movable members 124 and 126 adjacent the exhaust line 16, simultaneously move in a direction opposite to the path of movement of the transfer unit 10 but at the same speed. This results in the pick-up heads 46 on the side of the pick-up conveyor 70 adjacent the sealing line 14, and the discharge heads 130 on the side of the discharge conveyor 72 adjacent the exhaust line 16, being in alignment with and relatively stationary with respect to the heads 18 on the sealing line 14 and the heads 52 of the exhaust line 16, respectively, to permit the transfer of lamps 12 therebetween. It should likewise be apparent that the pick-up heads 46 on the side of the movable member 92 of the pick-up conveyor 70 adjacent the discharge heads 130 on the movable members 124 and 126 of the discharge conveyor 72 align with each other and move in the same direction as the path of movement of the transfer unit 10 but at twice the speed of the heads 46 and 130 on the other side of the axes of their respective drive shafts 86 and 116, thus permitting the transfer of the lamps 12 (FIG. 10) from the pick-up heads 46 to the discharge heads 130 during the period in which the heads 46 and 130 are in alignment with each other.

Operation of the transfer unit

By reference particularly to FIGS. 3 and 4, it will be apparent that the vertical axis of each pick-up head 46 of the pick-up conveyor 70 is radially located on the sprocket member 90 at a distance from the shaft 86 which is less than the radius of said sprocket member 90. Thus, as the transfer unit 10 moves to the left (FIG. 1) between the sealing line 14 and the exhaust line 16 and the sprocket member 90 rotates in clockwise direction (FIG. 2), the vertical axis of each pick-up head 46 follows the path of a curtate cycloid (FIG. 11). This curtate-cycloidal path of movement of the pick-up head 46 extends from a starting position $C_1$, wherein the discharge head 130 of the discharge conveyor 72 is in alignment with the pick-up head 46, and through successive positions $C_2$, $C_3$ . . . to the last position $C_{13}$, where the pick-up head 46 is then aligned with a head 18 of the sealing line 14 at position $A_5$ (FIG. 10). As hereinbefore explained, the pick-up head 46 and sealing head 18 remain in alignment during the lowering of both the sealing spindle 24 and the sealed lamp 12 at positions $A_6$ through $A_8$ (FIG. 10) to permit the reception of the lamp 12 in the fingers 112 of the bulb holder 110 and thereafter allow the withdrawal of the pick-up head 46 carrying the lamp 12 from alignment with the sealing head 18 beginning at position $C_{14}$ (FIG. 11) and which corresponds to the position $A_8$ of FIG. 10. The pick-up head 46 again follows the path of the curtate cycloid through the successive positions $C_{15}$, $C_{16}$ . . . $C_{26}$, shown in FIG. 11, until the head 46 becomes aligned at position $C_{27}$ (FIG. 11) with a discharge head 130 of the discharge conveyor 72, at which position the tubulation-gripping jaws 134 and 136 of the discharge head 130 close about the tubulation 12t of the lamp 12, seated in the head 46.

The pick-up heads 46 and discharge heads 130 remain in alignment, as shown in FIG. 10, through the positions $C_{27}$, $C_{28}$, $C_{29}$ and $C_1$. During this path of joint movement, the elevating cam track 150 (FIG. 1) raises the discharge head 130 to lift the lamp 12 out of the pick-up head 46 by the time said heads arrive at position $C_1$. To permit the pick-up head 46 to begin its curtate cycloid motion and move away from the lamp 12 carried by the discharge head 130 while such head 130 continues its longitudinal motion, thus preventing breakage of the tubulation 12t of the lamp 12 by the head 46, it will be noted particularly from FIG. 13, that the discharge conveyor 72 on the transfer unit 10 leads the pick-up conveyor 70 by about ¼ of the distance of the spacing between the heads 46 and 130.

The sealed lamp 12 is then carried in the discharge head 130 around the grooved idler cam 154 in its elevated position until the head 130 and the lamp 12 arrive on the other side of the endless movable members 124 and 126 of the discharge conveyor 72 and are aligned (FIG. 10) with the compression-rubber assembly 54 of a head 52 on the exhaust line 16.

It will be understood from a consideration of FIGS. 2, 5, 6 and 7 that the vertical axis of each discharge head 130 during it path of movement around the idler cam 154, lies on an extension of a radius of the sprocket members 120 and 122 of the discharge conveyor 72 and will follow a path of a prolate cycloid through the successive positions $E_1$, $E_2$ . . . $E_{13}$, shown in FIG. 11, to the aligned position $E_{14}$, of FIGS. 10 and 11, with the compression-rubber assembly 54 on the exhaust head 52 as above mentioned. The discharge head 130, lamp 12 and the exhaust head 52 remain in alignment, as shown in FIG. 10, through the positions $E_{15}$, $E_{16}$, and $E_{17}$. During their alignment the cam track 150 lowers the head 130 and inserts the tubulation 12t of the lamp 12 in the compression-rubber assembly 54, so that when the discharge head 130 reaches the lowermost position $E_{17}$ of FIGS. 10 and 11, the tubulation 12t is fully inserted into the compression-rubber assembly 54. As shown particularly in FIG. 5, the plunger 140 of the discharge head 130 then engages the jaw-opening grooved cam 156 at position $B_1$ thus releasing the tubulation 12t of the lamp 12 from the discharge head 130, and permitting such head 130 with its jaws 134 and 136 now open, to move around the cam 156 along the path of a prolate cycloid through the positions $B_2$, $B_3$, $B_4$ (FIG. 5) and corresponding to positions $E_{18}$ through $E_{29}$ (FIG. 11). At position $B_4$ ($E_{29}$) the jaws 134 and 136 close about a tubulation 12t of another lamp 12 held in a second pick-up head 46 in the position $C_{27}$ (FIG. 11), and the transfer cycle is repeated.

Owing to the ¼ position offset, shown in FIG. 13, between the conveyors 70 and 72, a lamp 12 picked up from a sealing head 18 at position 1a by the transfer unit 10, and transferred to an exhaust head 52 at position 1b on the exhaust line 16, is moved longitudinally to the left, as viewed in FIG. 13, 10¼ or 9¾ positions.

Since stationary lines of work stations are employed by the automatic manufacturing machine of the present invention and are shown (FIG. 12), it has been found advantageous to employ a transfer conveyor 198 (FIGS. 12, 14 and 15 through 17) having a pair of movable members 200 and 202, such as endless chains, for receiving sub-assemblies, such as lamp mounts 12m and bulbs 12b, from a plurality of indexing article-fabricating machines, such as automatic mounting machines 204 of the type shown in U.S. Patent No. 2,637,144, issued May 5, 1953, to R. M. Gardner et al. and a bulb feeder 206 of the type shown in U.S. Patent No. 1,783,806, issued December 2, 1930, to W. W. Loebe et al. respectively. These movable members 200 and 202 then present the mounts 12m and bulbs 12b respectively in a stationary line for transfer by a mount-transfer unit 10m and a bulb-transfer 10b respectively to a stationary work line, such as the sealing line 14. The loading side of the movable members 200 and 202 is moved three stations to the right, as viewed in FIG. 12, by a first drive means, such as the loading side drive 208, at a first index station $S_L$ (FIG. 17) at a first rate of index, namely 3200 times each hour or once every 9/8 seconds (FIG. 14). This first rate of index is in synchronism with the rate of output of the bulb feeder 206, the automatic mount machines 204 and associated transfer devices 210 which transfer the lamp mounts 12m from the automatic mounting machines 204 to the movable member 200 at a plurality of stations on the loading side. The unloading side of the movable members 200 and 202 is moved ninety-six stations to the left, when viewed in FIG. 12 by a second drive means, such as the unloading side drive, 212, (FIG. 17) at a second index station $S_U$ at a slower rate of index, namely one hundred times each hour or once every thirty-six seconds (FIG. 14), than the rate of index of the automatic mounting machines. Due to the greater rate of index of the automatic mounting machines 204, the portion of the movable members 200 and 202 moving from the first index station $S_L$ to the second index station $S_U$ gradually increases in length and the remaining portion gradually decreases in length.

Transfer conveyor

To provide a frame for the transfer conveyor 198 of the present invention (FIGS. 12, 14 and 15 through 17), a pair of upper longitudinal channels 214 and a pair of lower longitudinal channels 216 are secured to horizontal tie members 218 and legs 220.

For the purpose of supporting the unloading side of the movable members 200 and 202 in their path of movement from the first index station $S_L$ to the second index station $S_U$ and back again to the former station, a plurality of guide members 222, suitably sprockets, are fixed to shafts 224 rotatable in suitable bearings 226 upstanding from a plurality of mounting plates 228 disposed on the bottom surface of the upper channels 214. To support the loading side of the movable members 200 and 202, guide members 230, also sprockets, are mounted on shafts 232 rotatable in bearings 234 disposed in spaced relation on a longitudinal channel member 236 of a reciprocating carriage 238. It will be apparent from FIGS. 12, 15 and 17 that the innermost guide members 222 on the unloading side are spaced farther from the longitudinal axis of the reciprocating carriage 238 than the remaining guide members 222, with such off-set of these innermost guide members 222 providing an unobstructed path of movement or unloading zone for the mount-transfer unit 10m and the bulb-transfer unit 10b (FIG. 12) as said transfer units leave the curved portions of the sealing line 14 and align themselves parallel to the sealing line 14.

So that the carriage 238 may be moved to the right, as viewed in FIGS. 12, 15 and 17, by the portion of the movable members 200 and 202 between the second index station $S_U$ and the first index station $S_L$ to compensate for the difference in the rate of movement of the loading and unloading sides of the movable members, the longitudinal member 236 of the carriage 238 is mounted on the upper channels 214 by means of a plurality of opposed pairs of vertical rollers 240, and a plurality of pairs of horizontal rollers 242. These rollers engage the channels 214 at positions along the length of the longitudinal member 236 and also prevent motion of the carriage 238 in a vertical plane and in a plane transverse to the longitudinal axis of its reciprocatory movement.

To adapt the movable member 200 to receive lamp mounts 12m from the transfer devices 210, a plurality of mount-receiving heads 244 (FIG. 16), for example three hundred eight, as shown in FIG. 12, are disposed thereon the same distance apart as the sealing heads 18 of the sealing line 14. In like manner, the movable member 202 is provided with a similarly spaced number of bulb-receiving heads 246.

For the purpose of supporting the first drive means for the loading side of the transfer conveyor 198, drive members 248, both suitably sprockets, are affixed to a shaft 252 journalled in a bearing 254 upstanding from a support plate 256 secured to one of the tie members 218.

*First drive means for loading side of transfer conveyor*

The aforesaid shaft 252 of the first drive means 208 also carries a keyed ratchet wheel 272, as well as a pawl arm 274 and a rack pinion gear 276 joined together by a bushing 278 (FIG. 17) which is rotatable on the shaft 252. The pinion gear 276 engages a rack 280 slidable in a guide 282 provided in the lower portions, as viewed in FIGS. 16 and 17, of the bracket for the bearing 254 carrying the shaft 252. The free end of the pawl arm 274 carries a stud shaft 284 on which is mounted a pawl 286 engageable with the ratchet wheel 272 to cause counterclockwise rotation (FIG. 17) of such ratchet wheel 272 and the attendant indexing of the loading side of the movable members 200 and 202 a desired number of, for example three stations to the right, as viewed in FIG. 17, upon rotation of the shaft 252.

To provide a prime mover for the first drive means 208 for the loading side of the movable members 200 and 202, the left-hand end of the rack 280, as viewed in FIG. 17, is affixed to an operating rod 288 of an air cylinder 290. The air cylinder 290 is provided with two in-let lines 292 and 294 for passage of air thereinto. Admission of air through line 292 causes respective movement of the piston rod 296 to the left with attendant counterclockwise rotation of pinion gear 276 and shaft 252, as viewed in FIG. 17, and resultant indexing of the movable members 200 and 202 three index positions to the right. Admitting the air through line 292 causes the piston rod 296 to return to its initial position in the cylinder 290, as shown in FIG. 17. The lines 292 and 294 are connected by means of a four-way valve 298 to an air line 300 extending from a high-pressure air supply (not shown).

In order to operate the valve 298, an operating rod 302 of the valve 298 has its normally free end connected to a reciprocating armature 304 of a solenoid 306. This solenoid 306 has one armature coil 308 connected to an "indexing" circuit and its other coil 310 included in a "resetting" circuit. The resetting coil 310 is energized upon closure of a normally open switch 312, mounted on an extension 314 of the support plate 256 (FIG. 16) when the switch 312 is contacted by an arm 316 carried by the rack 280, upon movement of the latter to the left (FIG. 17).

As shown particularly in FIG. 17 the "indexing" circuit for the loading side of the transfer conveyor 198 extends from one side of a voltage supply, indicated by the legend "A.C. Supply," through a conductor 318 leading to one end of the coil 308 of the solenoid 306 and from the other end of the coil 308 through a conductor 320, to one side of a normally open switch 322 closable at a predetermined time by a cam 324 on a cam shaft 326 of one of the automatic mounting machines 204. This "indexing" circuit is then completed from the other side of the switch 322 by a conductor 328 to the other side of the voltage supply.

Thus, after the three automatic mounting machines 204 (FIG. 12) have each delivered a mount 12m to a mount-receiving head 244 on the loading side of the movable member 200 of the transfer conveyor 198 and the bulb feeder 206 (FIG. 12) has delivered a bulb 12b to three bulb-receiving heads 246, the cam 324 on the shaft 326 of one of the automatic mounting machines, closes the switch 322 thus energizing the indexing coil 308 of the solenoid 306, which energization causes the moving of the armature 304 in a counterclockwise direction, as viewed in FIG. 17. This arm rotation causes the passage of high-pressure air from the line 300 through the valve 298 and the line 294, thus moving the piston rod 296 of the air cylinder 290 to the left. In turn, this movement of the piston rod 296 causes the operating rod 288 and the rack 280 to likewise move to the left, as viewed in FIG. 17, and the pinion gear 276 and the ratchet wheel 272 to move in a counterclockwise direction thus indexing the loading side of the movable members 200 and 202 three positions to the right (FIG. 17) as above mentioned.

When the rack 280 reaches the end of its travel to the left, the switch operating arm 316 carried thereby closes the normally-open switch 312 which in turn closes the "resetting" circuit for causing the first drive means 208 for the loading side of the conveyor 198 to return to its initial position shown in FIG. 17.

This "resetting" circuit (FIG. 17) includes a conductor 330 extending from a junction point 332 with the conductor 318 (which effectively constitutes one side of the supply source) to one side of the normally open switch 312 and extends from the other side of the switch 312 by a conductor 334 to one end of the resetting coil 310 of the solenoid 306 and thence by means of a suitable conductor 336 from the other side of the coil 310 to the junction point 337 with the line conductor 328, which constitutes the other side of the supply source.

Closure of the switch 312 (by rack arm 316, as above mentioned) causes closure of this "resetting" circuit, thus energizing the resetting coil 310 of the solenoid 306 accompanied by movement of the solenoid armature 304 to the left (FIG. 17) with attendant rotation of the valve 294 in a clockwise direction. This valve rotation permits the flow of high pressure air from the line 300 through the valve 298 and the line 292 and causes the movement of the piston rod 296 in the air cylinder 290 to the right, to its initial position, as shown in FIG. 17. The resultant movement of the operating rod 288 attached to the piston rod 296 and the rack 280 in the same direction, rotates the gear 276 in a clockwise direction. However, since the gear 276 is free to rotate on the shaft 252 and the pawl 286 does not drive the ratchet wheel 296 during such rotation, the movable members 200 and 202 do not index.

Second drive means for the unloading of the transfer conveyor

In order to mount the second drive means for the unloading side of the transfer conveyor 198, a shaft 338 which carries drive members 339, suitably sprockets, is journalled in bearings 340 affixed to a support plate 341 projecting from the lower channels 216 and a lower plate 342 (FIG. 15). This shaft 338 also carries a gear 343 which meshes with a larger gear 344 on a shaft 346 journalled in suitable bearings 348 (FIG. 16). For the purpose of causing rotation of the shaft 346, a ratchet wheel 350 is keyed thereon and a pawl arm 352 and a rack gear 354 are connected together by a bushing 356 (FIG. 17) rotatable on the shaft 346. The pawl arm 352 carries a stud shaft 358 (FIG. 17) which is mounted on a pawl 360 in engagement with the ratchet wheel 350. As in the case of the first drive means 208 for the loading side of the movable members 200 and 202 of the transfer conveyor 198, the rack gear 354 engages a rack 362 slidable in a suitable guide 364 provided in a bracket of lower bearing 348 which bracket is attached to the plate 342 (FIG. 16) on the frame of the transfer conveyor 198. The right-hand end, as viewed in FIG. 17, of the rack 362 is attached to one end of an operating rod 366 projecting from a piston rod 368 of an air cylinder 370. This air cylinder 370 is provided with two high-pressure air supply lines 372 and 374 at its left and right hand ends respectively, as viewed in FIG. 17, which ends are connected by means of a four-way valve 376 to the aforementioned air supply line 300.

For the purpose of operating the valve 376, an operating arm 378 is pivotally connected to an armature 380 of a solenoid 382 whose indexing coil 384 and resetting coil 386 are in a second "indexing" circuit and a second "resetting" circuit respectively.

This second "indexing" circuit (FIG. 17) extends from the line conductor 318 through a conductor 388 leading to one end of the indexing coil 384 of the solenoid 382 and from the other end of such indexing coil 384 by a conductor 390 to one side of a normally-open switch 392, mounted on a plate 394 attached to the front upper channel 214 (FIG. 15) on the left-hand end of the unloading side of the transfer conveyor 198. The switch 392 is utilized for actuating the second drive means 212 for the unloading side and is operable by an arm 396, shown in dotted lines in FIG. 17, which arm 396 is carried by the frame portions of the bulb-transfer unit 10b (FIG. 12). Such second "indexing" circuit is then completed by a conductor 398 extending from the other side of the switch 392 to a junction point 400 with the line conductor 328.

Thus, when the arm 396 (FIG. 17) on the transfer unit 10b closes the normally-open switch 392 this second "indexing" circuit is closed, thus energizing the indexing coil 384 of the solenoid 382 and causing the movement of the solenoid armature 380 to the left, as viewed in FIG. 17. This movement of the armature 380 rotates the operating arm 378 and the valve 376 clockwise to permit the passage of high-pressure air from the supply line 300 through the valve 376 and the line 372, thus causing the movement to the right (FIG. 17) of the operating piston rod 368 of the air cylinder 370 together with the operating rod 366 and the rack 362 attached thereto. Such movement of the rack 362 rotates the rack gear 354 and the ratchet wheel 350 and the gear 344 on the shaft 346 in the clockwise direction, as viewed in FIG. 17. Due to the length of the cylinder 370 and the gear ratio of the second drive means 212, this clockwise rotation of the gear 344 rotates the meshing gear 343 and drive members 339 on the shaft 338 in a counterclockwise direction, resulting in the attendant movement of the unloading side of the movable members 200 and 202 of the transfer conveyor 198 to the left, as viewed in FIGS. 12 and 17, for a total of ninety-six index positions, and presenting a full compliment of loaded mount-receiving heads 244 and bulb-receiving heads 246 to the unloading zone adjacent the path of movement of the transfer units 10m and 10b. Simultaneously, the indexing of the unloading side of the movable members 200 and 202 these ninety-six positions to the left, also causes the reciprocating carriage 238 to likewise move to the left (FIG. 15) to compensate for the movement of the movable members to the above-noted ninety-six positions.

Near the end of this indexing movement of the rack 362, an arm 402 carried on the forward end, as viewed in FIG. 17, of the rack 362 engages a normally-open switch 404 affixed to the air cylinder 370. This switch 404 controls closure of the second "resetting" circuit for returning the second drive means 212 for the unloading side to its starting position. This "resetting" circuit extends from the line conductor 318 (FIG. 17) through the conductor 388 to one side of the switch 404 and from the other side of the switch 404 by means of a conductor 406 to one end of the resetting coil 386 of the solenoid 382. This circuit is then completed by a suitable conductor 408 extending from the other end of the coil 386 to the junction 400 with the conductor 398 which is connected to the line conductor 328.

Closure of the switch 404 by the arm 402 closes the second "resetting" circuit, thus causing energization of the coil 386 of the solenoid 382 with attendant movement of the solenoid armature 380 to the right, as viewed in FIG. 17. Such movement rotates the operating arm 378 of the valve 376 in counterclockwise direction to the position shown in FIG. 17, permitting the flow of high-pressure air from the line 300 through the valve 376 and the line 374 into cylinder 370 to cause the movement of the operating piston rod 368 to the left, as viewed in FIG. 17, thus resulting in the return of the second drive means 212 for the unloading side of the movable members 200 and 202 of the transfer conveyor 198 to the starting position. As in the case of the first drive means 208 for the loading side of such movable members 200 and 202, the pawl 360 does not effect any movement of the ratchet wheel 350 or the unloading side of the movable members during this return movement of such second drive means 212.

Operation of transfer conveyor

As shown in FIG. 12, the second and third transfer devices 210 associated with the automatic mounting machines 204, numbered from left to right, deliver their mounts 12m to mount-receiving heads 244 which are twenty-five and fifty-one stations to the right respectively, from the head 244 to which the first transfer device 210 delivered its mount 12m. This disposition of the transfer devices 210 assures the feeding of a mount 12m (FIG. 18) to each mount-receiving head 244 on the loading side of the of the transfer conveyor 198. The bulb feeder 206 is located with respect to the bulb-receiving heads 246 to simultaneously feed a bulb 12b to each of three bulb-receiving heads 246 spaced four stations apart on the upper movable member 202 of the transfer conveyor 198, so that when the heads 246 on the upper movable member 202 have completely passed the bulb feeder 206, each head 246 will be loaded with a bulb 12b.

Since each of the automatic mount machines 204 (FIG. 12) is capable of producing 3200 mounts per hour and the bulb feeder 206 is capable of delivering 9600 bulbs per hour, the transfer devices 202 and bulb feeder 204 respectively deliver three mounts 12m and bulbs 12b every $$\frac{3600}{3200} = \frac{9}{8} \text{ seconds}$$

(FIG. 14), or ninety-six mounts 12m and bulbs 12b every 36 seconds, to the loading side of the transfer conveyor 198. Further every 9/8 seconds the first drive means 208 for the loading side will index the loading side of the movable members 200 and 202 three stations to the right, as viewed in FIG. 12. While the unloading side of the transfer conveyor 198 is maintained stationary, each three-station index of the loading side to the right, as viewed in FIGS. 12, 15 and 17 causes the carriage 238 to move ½ of this distance to the right on the upper channels 214 to compensate for the difference in the rate of indexing movement between the two sides of the movable members 200 and 202.

After the mount-transfer unit 10m and bulb-transfer unit 10b transfer the mounts 12m and 12b from the heads 244 and 246 respectively to the sealing heads 18 on the stationary line 14, the second drive means 212 for the unloading side of the transfer conveyor 198 is then actuated by closure of the switch 392 by the arm 396 on the transfer unit 10b, as previously mentioned, and ninety-six loaded heads 244 and 246 are indexed into the unloading zone between the inner guide members 222, as viewed in FIGS. 12 and 17. During the indexing of the unloading side of the transfer conveyor 198 the carriage 238 moves to the left, as viewed in FIGS. 12, 15 and 17 to again compensate for the differences in the rate of indexing movement between the two sides of the movable members 200 and 202.

*Joint operation of the transfer conveyor and transfer units*

It will be understood from a consideration of FIG. 12 that the automatic high speed machine of the present invention is of the tandem type, provided with duplicate tooling on each side of the longitudinal axis of said machine and while only the operation on one side may have been described in detail, the operation on the other side of the longitudinal axis is identical.

After the transfer conveyor 198 has delivered ninety-six loaded mount-receiving heads 244 and ninety-six loaded bulb-receiving heads 246 to the unloading zone on the unloading side of the transfer conveyor 198 and while such unloading side is then maintained stationary, the mount-transfer unit 10m and bulb-transfer unit 10b move, as hereinbefore stated, between the stationary lines of heads 244 and 246 of the transfer conveyor 198 and the stationary line of sealing heads 18, from the right to the left, as viewed in FIG. 12 (referring to the portion of the machine above the longitudinal axis), to effect the desired transfer of the parts.

Every time a lamp mount 12m or a bulb 12b is transferred by means of the transfer units 10b and 10m the transferred article advances 9¾ stations to the left, as viewed in FIGS. 12 and 13, from the pick-up point, position 1a (FIG. 13) on the article-feeding line to the discharge point, position 1b, on the article-receiving line. Each side of the tandem-sealing line 14 has ninety-six work positions, ten empty positions for this transfer offset and four empty positions at the beginning and end of the operating line to permit the transfer units 10b etc. to present themselves in a longitudinal straight position between the work lines. Since there are four transfer operations in the examples shown in FIG. 12, each side of the tandem work lines has 96+4 x 10+8 or 144 stations. The total length of the longitudinal operating portion of the sealing line is only $$144 \times \frac{6''}{12}$$

or 72 ft.

Assuming that the speed of the transfer units 10m and 10b, is 4.72 stations or 2.36' per second, the total time required for the transfer units to transverse one of the longitudinal operating portions of the sealing line is $$\frac{144}{4.72}$$

or 30.5 seconds. Allowing 5.5 seconds to negotiate the curved portions of the sealing line 14, this gives a total of 36 seconds for a given transfer unit to complete its work cycle. Because there are forty-eight empty positions on the sealing line 14, the transfer unit will travel $$\frac{48}{4.72}$$

or 10.2 seconds through empty positions on each of the longitudinal sides of the sealing line 14. This 10.2 seconds plus 5.5 seconds for negotiating the curved portion of the machine provides 15.7 seconds (FIG. 14) for the transfer conveyor 198 to present ninety-six loaded heads 244 and 246 to the unloading zone, adjacent the path of movement of the transfer units 10m and 10b. If the transfer conveyor 198 travels at a rate of 3.5 ft. per sec., the conveyor will negotiate the $$96 \times \frac{6''}{12}$$

or 48 ft. in 13.7 seconds, which time is ample to accomplish the indexing of the unloading side of the transfer conveyor 198 before the other pair of transfer units 10m and 10b present themselves to the now loaded unloading zone of the transfer conveyor 198.

Thus, from the above description it is apparent that when the arm 396 on the transfer unit 10b closes the switch 392 on the frame of the transfer conveyor 198 (FIG. 15) to complete the second "indexing" circuit, a supply of ninety-six mounts 12m and bulbs 12b will have accumulated on the loading side of the transfer conveyor 198 and there is sufficient time, namely, 15.7 seconds, (FIG. 14) for the second drive means 212 for the unloading side of the transfer conveyor 198 to index a full complement of ninety-six mounts 12m and bulbs 12b into the unloading zone on the unloading side of said transfer conveyor 198 for transfer thereof to the sealing line 14 by the other pair of transfer units 10m and 10b.

*Automatic high-speed manufacturing machine*

The tandem-type automatic high-speed machine of the present invention (FIG. 12) comprises on each side thereof, as hereinbefore mentioned, the three automatic mounting machines 204 and associated mount-transfer devices 210, the bulb feeder 206, the transfer conveyor 198, the mount transfer unit 10m and bulb transfer unit 10b, and the stationary sealing line 14 and exhaust line 16. In addition to these, such automatic high-speed machine also includes a plurality of, for example, two additional similar work lines, namely a basing line 412 and a seasoning and testing line 414 and a packing conveyor 416.

It will be understood from a consideration of FIG. 12 that a transfer unit 10 (FIGS. 1–4) is employed between the sealing line and the exhaust line 16 to transfer the sealed lamps 12 therebetween. To transfer the exhausted lamps 12 from the exhaust heads 52 on the stationary exhaust line 16 to basing heads 418 on the stationary basing line 412 a similar transfer unit $10e_1$, is employed between the stationary lines 16 and 412. This transfer unit $10e_1$, is desirably provided with a means for inverting the exhausted lamps 12 during transfer, such as shown in FIGS. 33 and 34. For the purpose of supplying bases 12c (FIG. 18) to the inverted exhausted lamps 12 held in the basing heads 418, a base-feeding device (of the type shown in U.S. Patent No. 2,137,173, issued November 15, 1938, to J. J. Malloy) is positioned adjacent the stationary exhaust line 16 to feed the bases 12c to a second transfer device $10e_2$ for transfer of such bases to the inverted exhausted lamps 12 in the heads 418. To accomplish the transfer of the based lamps 12 from the basing line 412 to the seasoning and testing line 414 a transfer unit 10f is utilized.

As shown in FIG. 12, the distances between units 10m and 10b etc. while such units are traversing the longitudinal portions of the high-speed automatic machines (shown in the upper portion of such figure) are fixed by operating the units at the same controlled linear speed. While the units are traversing a curved end portion of the machine (such as the left-hand portion), the speeds of such units are varied so that the units will arrive at the opposite longitudinal straight portions (shown in the lower portion of FIG. 12) with the same identical fixed distances between units.

Thus, it will be seen from the above description of the operation of the automatic high-speed manufacturing machine that 6×3200 or 19,200 mounts 12m per hour are produced by the six automatic mounting machines 204 and 19,200 mounts 12m and bulbs 12b (FIG. 18) are delivered by the transfer devices 210 and bulb feeders 206 respectively to the transfer conveyors 198. Further, the unloading sides of the two transfer conveyors 198 will deliver 2×96 of 192 mounts 12m and bulbs 12b per every 36 seconds or $$\frac{192 \times 3600}{36}$$

or 19,200 mounts 12m and bulbs 12b per hour to the pair of sealing lines 14. In the same manner the two exhaust lines 16, basing lines 412, seasoning and testing lines 414 will also cooperate to deliver 19,200 fabricated lamps 12 per hour to the packing conveyor.

The automatic high-speed machine of the present invention shown in FIG. 12, may be modified by adding work units, similar to the compound transfer unit 10 (FIGS. 1 and 2) and simplex transfer units, in which the transfer heads are replaced by work tools adapted during their relatively stationary alignment with a head on a stationary work line to perform short term work functions, such as seal molding, inverting a lamp while transferring it, lead-wire bending and flattening, and base-feeding and threading. In this alternative embodiment of the machine the duplex transfer unit 10 shown in FIG. 19 for transferring sealed lamps from the sealing line 14 to the exhaust line 16 and the compound transfer unit 10f (FIG. 12) for transferring the based lamps from the basing line 412 to the seasoning and testing line 414 are retained. The compound transfer unit $10_{e1}$ (FIG. 12) for transferring exhausted lamps from the exhaust line 16 to the basing line 412 may be replaced by a compound lamp-transfer and lamp-inverting unit $10_{w2}$ shown in FIGS. 24 and 25 and operable between the exhaust line 16 and the basing line 412 to invert while transferring the "tabulation down" exhausted lamps into the "tabulation up" position, when delivered into the basing heads 414. To these units are added, as shown in FIG. 19, a simplex seal-molding unit $10_{w1}$ (FIGS. 20 through 23) movable along the sealing line 14 for the purpose of molding the sealed portions of the sealed lamps 12; a simplex wire-bending and flattening unit $10_{w3}$ (FIGS. 26 through 36) operable along the basing line 412 to bend the side-lead wire into the desired position and flatten the same preparatory to the base threading operation; and a simplex base-feeding and threading unit $10_{w4}$ (FIGS. 37 through 43) also operable along the basing line 412 to feed and thread a base over the lead wire of a lamp 12 supported by a basing head 418 on the basing line 412. These work units $10_{w1}$, $10_{w3}$ etc. move along their respective stationary work lines 14, 16, etc. at, a speed $V_1$ ft./sec. (i.e. about 2.36 ft./sec.) in the direction of the arrow (FIG. 19) and their individual movable members are moved on such work units at the same speed in the directions indicated similarly by arrows (FIG. 19), so that the work heads on the work units become aligned with and are relatively stationary with respect to the work stations on the respective stationary work lines with which they are associated.

In order to facilitate the description of the structure and operation of the above-mentioned work units, such work units will be described in the order in which they perform their function upon the product being produced by the assembly of its individual parts, namely an incandescent lamp, as follows: simplex seal-molding unit $10_{w1}$ (FIGS. 20 through 23); compound transfer and lamp-inverting unit $10_{w2}$ (FIGS. 24 and 25); simplex wire-bending and flattening unit $10_{w3}$ (FIGS. 26 through 36); and simplex base-threading unit $10_{w4}$ (FIGS. 37 through 43).

*Seal-molding unit*

To provide a frame for the simplex seal-molding unit $10_{w1}$ (FIGS. 20 through 23) of the present invention, a rectangular top table 494, intermediate table 496 and bottom table 498 are integrated at their end portions (FIG. 20) by a plurality of upright vertical columns 500.

For the purpose of furnishing a supporting structure for a movable seal-molding conveyor 502, an upper endless movable member and lower endless movable member, such as the chains 504 and 506, extend around and are supported by guide members, such as sprockets 508. The sprockets 508 are mounted on a pair of vertical shafts 510 suitably journalled in the upper table 494 and the intermediate table 496. To attach each of a plurality of equi-spaced molding heads 512, ten for example (FIGS. 20 and 21), to the chains 504 and 506, a pivot rod 516 is secured by means of its reduced diameter outer portions in suitable lug extensions 518 of the chain links. A collar 520 is adjustably secured to the rod 516 to support (at a desired height) half-molds 522 which are pivotable on a suitable bushing on the rod 516.

A mold-opening mechanism is provided for the half-molds 522 comprising an operating arm 524 (FIG. 20) pivotably connected to a lug 526 on each half-mold 522 and such arm 524 is pivotably mounted on a cam-roller shaft 528. This shaft 528 carries a cam roller 530 on its lower end engageable with a mold-operating cam 532 mounted at each end of the seal-molding unit $10_{w1}$ on the underside (FIG. 23) of a longitudinal supporting plate 534 which rests (by means of a flanged bushing on each of the shafts 510) on the lower sprockets 508 on such shafts.

In order to provide means for keeping the half-molds 522 in alignment (particularly when closed) with sealing heads 18 on the sealing line 14, the upper portion of each roller shaft 528 is contained within a longitudinal slot 536 provided in an inward extension 538 (FIGS. 22 and 23) of the lower mounting lug 518 on the links of the upper chain 504, with the roller shaft 528 being reciprocable in the slot 536 during operation of the mold-opening mechanism.

The means utilized to drive the upper chain 504 and the lower chain 506 comprises a motor 540 (FIG. 20) affixed to the lower table 498 and utilized to drive a drive gear 542 on a motor-drive shaft 544. Such drive gear 542 meshes with a pinion 546 on the left-hand shaft 510, as viewed in FIG. 20. In order that the seal-molding unit $10_{w1}$ may be simultaneously moved along the stationary sealing line, the drive gear 542 (FIG. 20) also meshes with a second pinion 548 on a stud shaft 550 journalled in the intermediate table 496 and lower table 498 and a larger pinion 552 on the stud shaft 550 meshes with a stationary rack 554 (FIGS. 22 and 23) affixed to the stationary sealing line 14. As in the preferred embodiment of the automatic high-speed machine a pair of vertical rollers 556 and 558 (FIG. 23) are mounted on brackets 560 depending from each of the four corners of the bottom table 498 and engage the top and bottom surface respectively of guide tracks 562 secured to the lines 14 and 16, thereby eliminating vertical movement of the simplex seal-molding unit $10_{w1}$ during its movement between the stationary sealing line 14 and the stationary exhaust line 16, carrying the weight of such work unit and keeping it aligned along its path of movement. To prevent lateral movement of the simplex seal-molding unit $10_{w1}$, a horizontal roller 564 mounted adjacent each pair of vertical rollers 556 and 558, engages the inner face of its respective guide track 562.

Upon energization of the motor 540, the drive gear 542 is rotated in counterclockwise direction, as viewed in FIG. 20, which thereby rotates gear 552 on the stud shaft 550 in clockwise direction. Since this gear 552 engages the stationary rack 554, as previously mentioned, the simplex seal-molding unit $10_{w1}$ moves to the left, as viewed in FIG. 19, along the guide tracks 562 between the stationary sealing line 14 and stationary exhaust line 16. At the same time counterclockwise rotation of the drive gear 542 rotates the pinion gear 546 on the left-hand shaft 510 of the seal-molding conveyor 502 so that the sprockets 508 and the rearward shaft 510 are in turn rotated in clockwise direction.

As an empty closed molding head 512 is moved along the forward longitudinal side of the upper chain 504 and lower chain 506, a compression spring 566 extending between the pivot rod 516 and roller shaft 528 maintains the half-molds 522 in the closed position. When the roller 530 engages the arcuate cam 532 on the left-hand end of the simplex seal-molding unit $10_{w1}$ (beginning at position "1," FIGS. 21 and 22 and ending at position "2"), the cam moves the roller 530 and hence the roller shaft 528 inwardly against the action of the spring 566 thereby pivoting the operating arms 524 on the shaft 528 with resulting diverging pivotable movement of the half-molds 522 on the pivot rod 516 from the closed position indicated in FIG. 22 at position "1," to the open position at position "2." The mold 512 remains in such open position while it completes its prolate-cycloidal motion into alignment with a lamp 12 being sealed on a sealing head 18 at Station "A" on the stationary sealing line 14. After becoming properly aligned with the lamp 12, the roller 530 rolls off a lip 568 (FIG. 22) on the cam 532 with resultant spring-tensioned closure of the half-molds 522 about the seal portions of the lamp 12 when the stationary sealing head 18 and the now aligned molding head 512 reach the imaginary position "$A_1$" (FIG. 21). As indicated in FIGS. 20 and 21, the mold 512 remains closed about the sealed portions of the lamp 12 until the stationary sealing head and the now closed mold 512 reach the imaginary position $D_1$, whereupon the roller 530 engages the cam 532 on the right-hand end of the simplex seal-molding carriage $10_{w1}$, as viewed in FIGS. 20 and 21, and the half-molds 522 are opened, thereby releasing the sealed portions of the lamp 12 to permit the transfer of such sealed lamp by a compound transfer unit 10 (FIG. 19) to the stationary exhaust line 16.

After the sealed lamp 12 is exhausted on the stationary exhaust line 16, such lamp may be transferred (and inverted during transfer) to the stationary basing line 412 by a compound lamp-transfer and inverting unit $10_{w2}$ (FIGS. 24 and 25), or the lamp may alternatively be trasferred to the basing line 412 and during transfer such lamp may be inverted and have its side-lead wire bent and flattened by the compound wire-bending and flattening unit $10_{w3}$.

*Lamp-transfer and inverting unit*

A compound lamp-transfer and inverting unit $10_{w2}$ in accordance with the present invention is shown specifically in FIGS. 24 and 25 and comprises a frame having a rectangular top table 570, intermediate tables 572 and 574 and bottom table 576 (FIG. 25) integrated along their side portions by a pair of side plates 578.

For the purpose of furnishing a supporting structure for a movable lamp pick-up and inverting conveyor $70i$, an endless movable member, such as the chain 580, extends around and is supported by guide members, such as sprockets 582, mounted on short shafts 584 journalled on the side plates 578, with such sprockets 582 and hence the chain 580 being disposed in a vertical plane parallel to the side plates 578. To attach each of a plurality of equi-spaced pick-up heads $46i$, for example ten (FIG. 24), to the vertically disposed chain 580, such heads $46i$ (which are similar to the discharge heads 130, FIGS. 5, 6 and 7) are mounted by means of link pins extending through their slotted body portions $132i$ on the individual links of the chain 580.

It will be seen from a consideration of FIGS. 24 and 25 that a pair of jaws $134i$ and $136i$ are pivotably mounted in the body slot with the outer ends of such jaws being adapted to normally close about and grip the bowl of an exhausted lamp 12. The inner ends of these jaws $134i$ and $136i$ are engageable by a pin (not shown) carried by the inner end of a reciprocable plunger $140i$ (FIG. 25) extending through the inner side wall of the body $134i$. In order to maintain the outer end of the plunger $140i$ in its normally extended position, which position in turn keeps the jaws $134i$ and $136i$ closed through engagement of the pin (not shown) with the inner ends of such jaws, a coil spring (not shown) surrounds the plunger $140i$, where it passes through a bushing (not shown) provided in the body $132i$, and the spring forces the plunger $140i$ outward of the body $132i$.

A jaw-opening mechanism for the jaws $134i$ and $136i$ is provided adjacent positions "1" and "2" of such pick-up heads $46i$ (FIG. 24) comprising a longitudinal stationary cam 588 acting on the plunger $140i$ (FIG 25) against the force of the coil spring (not shown), and longitudinally disposed along the forward left-hand side plate 578, as viewed in FIG. 25. A circular stationary cam 590, similar to the cam 156 (FIG. 5), is disposed on the same side plate 578, and acts as a continuation of the stationary longitudinal cam 588 which together with a further longitudinally disposed cam 592 on the side plae 578 along the bottom portions of the chain 580 adjacent positions "4" and "5," maintains the jaws $134i$ and $136i$ open from position "2" through position "5" (FIG. 24). When the plunger $140i$ runs off the cam 592 between positions "5" and "6" the jaws $134i$ and $136i$ are again closed at position "6," thus permitting the jaws $134i$ and $136i$ to grip the bowl of the exhausted lamp 12 supported on an exhaust head 52 which has been elevated into registry with the open jaws $134i$ and $136i$ at position "4" by a mechanism similar to the elevating device associated with sealing head 18 (FIG. 10).

The means utilized to drive the vertically disposed chain 580 at a speed $V_1$ ft./sec. (i.e. about 2.36 ft./sec.) comprises a bevel gear 594 (FIG. 25) on the horizontal shaft 584 engageable with a horizontally disposed bevel gear 596 on a stud shaft 598 rotatable in a suitable bearing mounted between the intermediate tables 572 and 574. A pinion rod 602 on the bottom of the stud shaft 598 is driven by a gear 604 mounted on the drive shaft 606 of a motor 608. In order that the lamp-transfer and inverting unit $10_{w2}$ may be moved along the stationary exhaust line 16 and the stationary basing line 412 toward the right, as viewed in FIG. 25, a second pinion 610 on the drive shaft 606 meshes with a stationary rack 616 affixed to the stationary basing line 412.

In order to carry the weight of the work unit $10_{w2}$, eliminate vertical movement of the compound lamp-transfer and inverting unit $10_{w2}$ and keep it aligned along its path of movement, a pair of vertical rollers 618 and 620 (FIG. 25) are mounted on brackets 622 depending from each of the four corners of the bottom table 576 and engage the top and bottom surface respectively of guide tracks 624 secured to the lines 16 and 412. To prevent lateral movement of the compound lamp-transfer and inverting unit $10_{w2}$, a horizontal roller 626 mounted adjacent each pair of vertical rollers 618 and 620 engages the inner face of its respective guide track 624.

Upon energization of the motor 608, the pinion gear 610 is rotated in counterclockwise direction about the vertical drive shaft 606, as viewed in FIG. 25. Since the pinion 610 engages the stationary rack 616, as previously mentioned, the compound lamp-transfer and inverting unit $10_{w2}$ moves to the right, as viewed in FIG. 24, along the guide tracks 624 between the stationary exhaust line 16 and the stationary basing line 412. At the same time the counterclockwise rotation of the drive gear 604 rotates the pinion 602 and the bevel gear 596 on the shaft 598 in clockwise direction (FIG. 25) about the vertical shaft 598, with resultant rotation of the vertically disposed bevel gear 594 and the sprocket 582 in clockwise direction about the horizontal shaft 584, as viewed in FIG. 24.

After the pick-up head 46i, with the jaws 134i and 136i held open by the longitudinally stationary cam 588, moves from position "1" to position "2," the open pick-up head begins its prolate-cycloidal motion in a vertical plane into alignment with an exhausted lamp 12 supported by an elevated stationary exhaust head 52 at position "4." It will be understood that the exhaust head 52 has been raised from its lower work position (not shown) to the position shown in FIG. 24 by the elevating mechanism (not shown) similar to the roller cam and shaft arrangement 36, 38 and 40, shown in FIG. 10 and utilized to elevate the sealing spindle 34.

Since the compound lamp-transfer and inverting unit $10_{w2}$ is moving to the right, as viewed in FIG. 24, at a speed $V_1$ ft./sec. and the lower portion of the chain 580 is moving toward the left at a speed of $V_1$ ft./sec., the open pick-up head 46i aligned with the exhaust lamp 12 on the exhaust head 52 remains relatively stationary with respect to such lamp at the positions "4" through "7," thereby permitting closing of the jaws 134i and 136i about the exhausted lamp 12 at position "6," when the plunger 140i runs off the lower longitudinal stationary cam 592.

The elevating mechanism (not shown) for raising and lowering the exhaust head 52 then lowers the exhaust head 52 to clear the exhausted lamp 12 held by closed pick-up head 46i and the chain 580 then carries the exhausted lamp 12 around the left-hand portion of the lamp pick-up and inverting conveyor 70i, through positions "8" and "9" and into alignment with a pair of jaws 134i' and 136i' of a discharge head 130i' of a horizontally disposed discharge conveyor 72i' of the compound lamp-transfer and inverting unit $10_{w2}$.

To provide a supporting structure for the discharge conveyor 72i', an endless movable member, such as the chain 630, extends around and is supported by guide members, such as the sprockets 634. These sprockets 634 are mounted on a pair of vertical shafts 635 suitably journalled in bearings affixed to the top table 570 (FIG. 25). To attach each of a plurality of the equi-spaced discharge heads 130i', for example ten (FIG. 24), to the chain 630, a slotted body 132i' of each head 130i' is secured by link pinss to the chain 630.

Since the discharge heads 130i' are similar in structure and operation to the discharge heads 130, FIGS. 5 through 7 and the pick-up heads 46i on the pick-up and inverting conveyor 70i, the preceding description of the structure and operation of the pick-up heads 46i is deemed sufficient.

To provide a jaw-opening mechanism for jaws 134i' and 136i' of each discharge head 130i', longitudinal stationary cam sections 636 are secured to top table 570 adjacent positions "6" and "7" on the far side of the discharge conveyor 72i and adjacent positions "9" and "10" on the near side of such discharge conveyor 72i, as viewed in FIG. 24. To maintain the jaws open as such discharge head 132i passes through positions "7," "8" and "9," a stationary arcuate cam section 628 is affixed on the top table 570 concentric with the left-hand sprocket 634, as viewed in FIGS. 24 and 25.

The chain 630 is driven at the same speed as the chain 580, namely $V_1$ ft./sec. and in the direction of the arrows in FIG. 24, by a bevel gear 640 (FIG. 25) which meshes with the aforementioned vertically disposed bevel gear 594 on the shaft 584. Thus, upon energization of the motor 540 (FIG. 20) the bevel gear 594, as hereinbefore mentioned, rotates in clockwise direction about the horizontal shaft 584, as viewed in FIG. 25, and accordingly rotates the bevel gear 640 in counterclockwise direction about the vertical shaft 635 to thus drive the sprockets 634 and the chain 630 in counterclockwise direction about the shafts 635, as viewed in FIG. 24.

After the exhausted lamp 12 has been moved into alignment with the open discharge jaws 134i' and 136i' of the discharge head 130i at position "9" by the pick-up head 46i, such discharge heads 130i' and pick-up heads 46i remain in alignment through the positions "9," "10," "1" and "2" (FIG. 24) due to the fact that the chains 630 and 580 are moving at the same speed, namely $2V_1$ ft./sec. and in the same direction. Between positions "10" and "1," the discharge jaws 134i' and 136i' are closed about the neck portion of the exhausted lamp 12 by the plunger 140i' of the head 130i' riding off of the longitudinal cam portion 636. Thereafter, between the same positions "10" and "1," the cam portion 588 opens the pick-up jaws 134i and 136i to release the bowl of the exhausted lamp 12. As the discharge head 130i' and the exhausted lamp held therein in the discharge jaws 134i' and 136i' move around the right-hand curved portion of the right-hand sprocket 634, as viewed in FIG. 24, along their prolate-cycloidal path of movement, they become aligned at position "4" with a basing head 418 (FIG. 25) on the stationary basing line 412 and remain relatively stationary with respect thereto through the positions "5," "6" and "7."

As the loaded discharge head 130i' moves into position "4," the basing head 418 is moved upwardly by an elevating mechanism (not shown, but similar to that shown in FIG. 10 for the sealing head spindle 24) to support the exhausted lamp 12 held in the jaws 134i' and 136i' of the discharge head 130i'. Between positions "6" and "7" of the discharge head 130i', the stationary cam 636 opens the jaws 134i' and 136i' and the above-mentioned elevating mechanism (not shown) for the basing head 418 lowers the basing head 418 to its normal work position.

Alternatively, the compound wire-bending and flattening unit $10_{w3}$ (FIGS. 26 through 36) moves along the stationary basing line 412 to pick up an exhausted lamp from the stationary exhaust line 16 and invert such lamp; to bend the side-lead wire of the exhausted lamp 12 and to flatten the same preparatory for a base-feeding and threading operation; and to deposit such lamp in the stationary basing line 412.

*Wire-bending and flattening unit*

The compound wire-bending and flattening unit $10_{w3}$ (FIGS. 26 through 36) of the present invention, comprises a frame formed by a rectangular top table 644 and a bottom table (not shown) integrated along their side portions by a pair of vertically disposed side plates 646.

Since the wire-bending and flattening unit $10_{w3}$ has a movable lamp pick-up and inverting conveyor 70k which is identical in structure and operation to the lamp pick-up and inverting conveyor 70i of the lamp-transfer and inverting unit $10_{w2}$, it is deemed sufficient to only briefly describe the structure and operation of such lamp pick-up and inverting conveyor 70k.

Such movable lamp pick-up and inverter conveyor 70k comprises an endless movable member, such as the chain 648 (FIGS. 26 and 29), extending around and supported by guide members, such as sprockets 650, with such sprockets 650 and hence the chain 648 being disposed in a vertical plane parallel to the side plates 464. The sprokets 650 are individually mounted on horizontal shafts 652 (FIGS. 26 and 29) suitably journalled in the side plates 646. To attach each of a plurality of equi-spaced pick-up heads 46k, ten for example (FIG. 26), to the vertically disposed chain 648, such heads 46k, which are similar to discharge heads 130 (FIGS. 5, 6 and 7), are mounted by means of link pins extending through their slotted body portions 132k on the individual links of the chain 648.

The means utilized to drive the vertically disposed chain 648 at a speed $V_1$ ft./sec. (i.e about 2.36 ft./sec.) in the direction of the arrows (FIG. 26) comprises a bevel gear 654 (FIG. 29) on the horizontal shaft 652 engageable with a horizontally disposed bevel gear 656 on a stud shaft 658, which stud shaft 658 is connected by a gear train similar to that shown in FIG. 25 to the drive shaft (not shown) of a motor (not shown). The wire-bending and flattening unit $10_{w3}$ is simultaneously moved along the stationary exhaust line 16 and stationary basing line 412 at a speed $V_1$ ft./sec. toward the right, as viewed in FIG. 26, by a driving arrangement (not shown) but which may be a pinion on a drive shaft which meshes with a stationary rack affixed to the frame of stationary basing 412.

Upon energization of the drive motor (not shown) the horizontal bevel gear 656 (FIG. 29) is rotated in clockwise direction by the stud shaft 658 which in turn is driven by the above-described driving arrangement (not shown). Such clockwise rotation of the bevel gear 656 rotates the vertically disposed bevel gear 654 in clockwise direction along with the horizonal shaft 652 resulting in movement of the chain 648 in the direction of the arrows (FIG. 26).

As shown in FIGS. 26 and 29, the pick-up jaws $134k$ and $136k$ of a pick-up head $46k$ are opened at position "C" by a longitudinal stationary cam 660 affixed to the left-hand side plate 464. Such open head $46k$ starts its circular motion (at position "D") around the right-hand sprocket 650, as viewed in FIG. 26, through position "$E_1$" and moves into alignment with an exhausted lamp on the exhaust head 52 (FIG. 24) of the stationary exhaust line 16 (FIG. 28). The pickup head $46k$ is relatively stationary with respect to and is aligned with the exhausted lamp 12 through four positions (not shown in FIG. 26) but identical to the positions "4" to "7" in FIG. 24. During such alignment the pick-up jaws $134k$ and $136k$ are closed about the exhausted lamp and the exhaust head is lowered to clear such gripped-exhausted lamp as previously described relative to FIG. 24. The pick-up head $46k$ then moves around the left-hand sprocket 560, as viewed in FIG. 26, along its prolate-cycloidal movement into alignment with open discharge jaws $134k'$ and $136k'$ of a discharge head $130k'$ on a bending, flattening and discharging conveyor $72k$.

A supporting structure is provided for the bending, flattening and discharging conveyor $72k$ which comprises endless movable members, such as the upper chains 662 and 664 (utilized to carry a plurality of wire-flattening units, for example ten) and a lower chain 666 (utilized to carry a like number of discharge heads $130k'$) extending around and supported by guide members, such as sprockets 668. These sprockets 668 are mounted on a pair of vertical shafts 670, suitably journalled in bearings provided in a top plate 673 which in turn is supported on pedestals 672 upstanding from the top table 644. To attach each of the ten eqpi-spaced discharge heads $130k'$ to the lower chain 666, a slotted body $132k'$ of each head $130k'$ is secured by link pins to such lower chain 666.

Since the discharge heads $130k'$ are similar in structure and operation to the discharge heads 130 (FIGS. 5 through 7) it is not deemed necessary to further describe the structure and operation of such discharge heads $130k'$.

To provide a jaw-opening mechanism for the jaws $134k'$ and $136k'$ of each discharge head $130k'$, a peripheral stationary cam 674 is secured to the pedestals 672 around the periphery of such descharge conveyor $72k$. This cam 674 engages the plunger $140k$ (FIG. 29) of each discharge head $130k$ to open and close the discharge jaws $134k'$ and $136k'$ between certain positions. For example the cam 674 opens such jaws between positions "G" and "H" and holds them open through position "H" to "B" (FIG. 28) when the plunger $140k'$ will then run off the cam 674 thus causing closure of the jaws $134k'$ and $136k'$ between positions "B" and "C", which jaws are maintained closed from position "C" through "G".

The means utilized to drive the upper chains 662 and 664 and the lower chain 666 at the same speed as the vertical chain 648, namely $V_1$ ft./sec., and in the direction of the arrows of FIG. 26, comprises a horizontal bevel gear 476 on the right-hand vertical shaft 670, as viewed in FIG. 26, which bevel gear 676 meshes with the bevel gear 654 on the horizontal shaft 652. Thus, upon energization of the motor (not shown) clockwise rotation of the bevel gear 654 by the horizontal shaft 652 causes the horizontally disposed bevel gear 676 to rotate in counter-clockwise direction along with the vertical shaft 670 resulting in movement of the bending, flattening and discharging conveyor $72k$ in the direction of the arrows shown in FIG. 28.

After the exhausted-inverted lamp 12 has been moved into alignment with the open discharge jaws $134k'$ and $136k'$ of the discharge head $130k'$ at position "A" (FIGS. 26 and 28) by the pickup head $46k$, the discharge head $130k'$ and the pick-up head $46k$ remain in alignment and are relatively stationary with respect to each other through positions "A", "B", "C" and "D" (FIGS. 26 and 28), due to the fact that the chains 666 and 648 are moving at the same speed, namely $2V_1$ ft./sec., and in the same direction.

A wire-bending device is operative by closure of the discharge jaws $134k'$ and $136k'$ to bend (between positions "B" and "C", FIG. 36) a side lead wire $12_{w1}$ (FIGS. 31 through 35) of the exhausted lamp 12 from the vertical position shown in FIGS. 31 and 32 over the molded seal to the horizontal position in FIGS. 33 to 35 on an anvil 679 of a wire-flattening unit carried by the upper chains 662 and 664. This wire-flattening unit is operative after the bending operation to flatten such bent lead wire $12_{w1}$ between positions "C" and "D".

*Side-lead wire bending device*

Each of the side-lead wire bending devices associated with a discharge head $130k'$ comprises a bellcrank shaped bending blade 678 pivoted at 680 between the bifurcations of a caster 682 and having a pivoted ball 688 at the end of the upper arm thereof. Each blade 678 is movable (between positions "A" and "B," FIG. 36) from the "up" position (shown at position "I," FIG. 29) to the "down" position (shown at position "C" of such figure) between the side-lead wire $12_{w1}$ and the top lead wire $12_{w2}$, as can be clearly seen in FIG. 32. Such bending blade 678 is then swingable laterally (between positions "B" and "C," while in the "down" position) from the position shown in FIG. 32 to the position shown in FIG. 33, to engage and bend the side-lead wire $12_{w1}$ over the molded seal portions of the exhausted lamp 12.

The above-mentioned vertical or swinging movement of the bell-crank shaped bending blade 678 about its pivotable connection 680 with the bifurcated caster 682, from the "up" position shown at position "I," FIG. 29, to the "down" positon shown at position "C" therein, is caused by a stationary peripheral cam 686 (mounted on the pedestals 672) which is engageable by the pivotable ball 688 carried on the upper arm of the bell-crank shaped bending blade 678 to thus cause vertical movement of such blade 678. To also permit lateral swinging movement of the bell-crank shaped bending blade 678, from the position shown in FIG. 32 to the position shown in FIG. 33, the caster 682 is pivoted on a plate 684 carried on the top of the body $132k'$ of a discharge head $130k'$.

As the discharge head $130k'$ and the bending blade 678 move from position "A" to position "B" (FIG. 30), an outwardly diverging section of the cam 686 moves the ball 688 on the upper arm on the bending blade 678 into vertical alignment with the center line through pivot 684 of the caster 682 and the pivot 680 for the bending blade 678, thus freeing the bending blade for lateral swinging movement. At the same time the cam 686 moves such bending blade from the "up" position shown at Station "I" (FIG. 29) to the "down" position (FIG. 32) between the side-lead wire $12_{w1}$ and top-lead wire $12_{w2}$, as shown also at Station "C" (FIG. 29). The laterally swinging movement of such bending blade 678 to bend the side-lead wire 12$_{w1}$ into the position shown in FIG. 33 is actuated by the closing movement of the discharge jaws 134$k'$ and 136$k'$ about an inverted exhausted lamp 12 held in the pick-up head 46$k$ between position "B" and position "C." During this closing movement of the discharge jaws 134$k'$ and 136$k'$, the right-hand bifurcation, as viewed in FIG. 26, of a bifurcated yoke 690 carried on the discharge jaw 136$k'$ engages (near the end of such closing movement, FIG. 36) the bending blade 678 to move it laterally from the position shown in FIG. 32 to the position shown in FIG. 33, with the attendant bending of the side-lead wire 12$_{w1}$ over the molded seal of the exhausted-inverted lamp 12 and into position on the anvil 679 of the wire-flattening unit. The bender plate 678 remains in the bending position, FIG. 33, (clear of the wire-flattening unit) through positions "C," "D" etc. through "G," whereupon it is returned to the original position shown in FIG. 32, by the diverging movement of the left-hand bifurcation of the yoke 690, on the discharge jaw 136$k'$ as it moves away from the other discharge jaw 134$k'$, upon opening of such jaws between positions "G" and "H" (FIG. 36).

Between positions "H" and "I" (FIG. 36) the cam 686 returns the bender plate 678 to the "up" position shown in FIG. 29.

*Wire-flattening unit*

The aforesaid wire-flattening unit is operative between positions "B" and "D" (FIG. 36) to drive a flattening hammer 692 (FIGS. 26 and 29) against the bent side-lead wire 12$_{w1}$, positioned on the anvil 679 once, as indicated by the solid-line in FIG. 36 and, if desired, more than once, as indicated by the two dotted-raised portions shown in such figure, thereby flattening such bent side-lead wire 12$_{w1}$.

The wire-flattening unit is mounted on the upper chains 662 and 664, as before mentioned, by plates 694 and 696 which are secured by link pins to such chains and are integrated by an E-shaped support bracket 698 supporting a solenoid 699 having a pair of solenoid coils, namely the "down" solenoid coil 700 and the "up" solenoid coil 702 (FIG. 27) for operating the flattening hammer 692. These solenoid coils 700 and 702 are operable respectively to move a partly metallic armature 704 of the solenoid 699 and the flattening hammer 692 carried thereby from the solid-line position shown in FIG. 27 downwardly to the dotted-line position shown therein into engagement with the bent side-lead wire 12$_{w1}$ positioned on the anvil 679, and back to the "up" or solid-line position shown therein.

The solenoid coils 700 and 702 are energized through bus bars 706, 708 and 710 which are secured to an insulating plate 712, mounted around the periphery of the bending, flattening and discharge conveyor 72$k$ by means of brackets projecting from the pedestals 672. For the purpose of supporting and guiding the wire-flattening units during their movement about such conveyor 72$k$, the plates 694 and 696 carry rollers 711 which ride on the insulating plate 712.

As shown in FIG. 27 bus bar 706 and the ground bus bar 708 are connected to the "up" coil 700 by brushes 713 (FIG. 30) whereas the ground bus bar 708 and bus bar 710 are similarly connected by brushes 713 to the "down" solenoid coil 702. Such bus bars are, of course, in turn connected by suitable conductors to a voltage supply, indicated by the legend "Voltage Supply" in FIG. 27.

As indicated in FIG. 36, the "down" solenoid coil 700 is energized (just before the discharge head 130$k'$ reaches position "C") to move the armature 704 downwardly and cause the flattening hammer 692 to strike the bent sidelead wire 12$_{w1}$, positioned on the anvil 679. As the discharge head 130$k'$ approaches position "D," "up" solenoid coil 702 is energized and the armature 704 is moved upwardly to return the flattening hammer 692 to the "up" position shown in FIG. 27. As indicated by the dotted-lines in FIG. 36, the side-lead wire 12$_{w1}$ may be struck a plurality of times (twice for example) between positions "C" and "D," by the flattening hammer 692 to produce the bent flattened side-lead wire 12$_{w1}$, shown in FIG. 35.

After the pick-up jaws 134$k$ and 136$k$ of the pick-up heads 46$k$ open adjacent position "C", the exhausted lamp 12, with its bent flattened side-lead wire 12$_{w1}$ held in the discharge head 130$k$, begins at position "C" its prolate-cycloidal motion around the right-hand sprocket 668 and becomes aligned at position "F" with a basing head 418 (FIGS. 29 and 30). Such basing head 418 is elevated from its lower work position (not shown) into registry therewith by an elevating mechanism similar to that shown in FIG. 10, for raising and lowering the sealing heads 18. Due to the fact that the wire-bending and flattening unit 10$_{w3}$ is moving to the right at a speed V$_1$ ft./sec. and that the chains 660, 664 and 666 are moving in the opposite direction and at the same speed, the discharge head 130$k'$ will remain relatively stationary in alignment with the elevated basing head 418 through the Stations "F", "G", "H" and "I".

Between Stations "G" and Station "H", basing-head jaws 714 close about the exhausted-inverted lamp 12. The discharge jaws 134$k'$ and 136$k'$ are then opened and the bending blade 678 is moved backwardly during such opening movement by the yoke 690 on the discharge jaw 136$k'$ to the position shown in FIG. 32. Between Stations "H" and "I" the bending blade 678 is moved upwardly by the cam 686 to the position shown at Station "I" in FIG. 29. The basing head 418 is then lowered to the normal work position and the cycle is repeated.

After the exhausted lamp 12 has been deposited in the basing head 418 (FIG. 19) by the compound wire-bending and flattening unit 10$_{w3}$, the simplex base-threading unit 10$_{w4}$ moves between the stationary exhaust line 16 and the stationary basing line 412 to thread a base 12$c$ over the top lead wire 12$_{w2}$ and into position on the molded seal portion of the exhausted lamp 12.

*Base-threading unit*

A frame for the simplex base-threading unit 10$_{w4}$ (FIGS. 37 through 43) of the present invention is provided by a rectangular base plate 716 and a casting 720, having a top 722 (FIG. 37), bottom 724 and walls or ribs 726, mounted by means of upper side plates 730 (FIGS. 37 and 38) on the base plate 716.

Such base-threading unit includes a movable base-threading conveyor 72$m$ comprising an endless movable member, such as the chain 732 (FIGS. 37 through 39), extending around supporting guide members, such as the inclined sprockets 734, which together with the chain 732 are hence disposed in a plane inclined from the horizontal, as shown in FIG. 37. These sprockets 734 are individually mounted on angularly disposed shafts 736 suitably journalled in bearings mounted in projections 738 formed in the casting 720. To attach each of a plurality of equispaced base-threading heads 130$m$, for example ten (FIG. 39), to the inclined chain 732, a mounting plate 740 (FIGS. 39, 40, 41 and 42) is secured to the chain 732, as by the link pins.

To provide mounting means for a vibratory type base-orienting and feeding device 742, such device is mounted on a supporting table 744, which in turn is supported by pedestals 746 upstanding from the top 722 of the casting 720 (FIGS. 37 and 39).

Each of the base-threading heads 130$m$ has a base-threading jaw 136$m$, suitably a bell-crank lever (FIG. 42), pivoted at 748 on the mounting plate 740. Such base-threading jaw 136$m$ swings away from an unloading platform 749 (FIG. 39) on the delivery end of an inverting tube 750 of the orienting and feeding device 742 (as a base-threading head 130$m$ moves into alignment with an oriented base 12$c$ presented by such unloading platform) by the engagement of a roller 751 on the inner end of such base-threading jaw 136m, as viewed in FIG. 39, with a first stationary cam 752 mounted on the supporting table 744 adjacent positions "K" and "A" of such head 130m along its path of movement on the base-threading conveyor 72m. The other base-threading jaw 134m, suitably a simple lever, is also pivoted at 748 (on top of the base-threading jaw 136m, FIG. 42) and is biased by means of a spring 754 normally into a closed position engaging the other base-threading jaw 136m.

To provide means for moving the base-threading jaw 134m out of the way of a base 12c, positioned on an exhausted lamp 12, at position "D" (FIG. 39), after the base-threading operation has been accomplished, the base-threading jaw 134m carries a roller 756 engageable with a second stationary cam 758 mounted on the supporting table 744 adjacent positions "D" and "E" of the path of movement of such base-threading heads 130m along the base-threading conveyor 72m. In order to prevent the base-threading jaw 134m from being pulled by the spring 754 along with the other base-threading jaw 136m when the first stationary cam 752 moves the other base-threading jaw 136m out of the way of the unloading platform 749 of the vibratory-type orienting and feeding device 742 adjacent positions "K" and "A", a stop 760 upstanding from the mounting plate 740 restrains such base-threading jaw 134m. The base-threading jaw 134m is returned to its normally closed position, shown adjacent position "B" and "C" of FIG. 39, after the second stationary cam 758 has swung such base-threading jaw 134m out of the way of the base 12c adjacent positions "D" and "E", by means of a spring 762 extending from the stop pin 760 to a lug 764 on the base-threading jaw 134m.

At the same time the other base-threading arm 136m is prevented from being pulled along with the base-threading jaw 134m by the spring 754 during such above-mentioned movement of the base-threading jaw 134m by the second stationary cam 758, by the restraining action exerted by the stop pin 760 upstanding from the mounting plate 740.

The drive means for the inclined chain 732 comprises a universal joint 765 (FIG. 38) connected to the left-hand shaft 736, as viewed from FIG. 39, and to an intermediate shaft 766 rotatable in a suitable bearing 767 in a projection on the end wall 726 of the casting 720. Said universal joint 765 is also connected to a shaft 770 rotatable in a lower bearing 772 provided in a projection of the bottom 724 of the casting 720. A pinion 774 (FIGS. 38 and 39) on the shaft 770 meshes with a drive gear 776 on drive shaft 778 (FIG. 39) of a motor 779 (FIG. 38). The base-threading unit 10$_{w4}$ is simultaneously moved along the stationary basing line 412 from right to left, as viewed in FIGS. 37 and 39, by the drive gear 776 also meshing with a pinion 780 (FIG. 39) on a shaft 782 journalled in the intermediate table 716 and a larger pinion 784 on such shaft 782 rides along a stationary rack 786 affixed to the stationary basing line 412.

For the purpose of carrying the weight of the simplex base-threading unit 10$_{w4}$, eliminating vertical movement of such unit, and keeping it aligned along its path of movement, a pair of vertical rollers 788 and 790, carried by brackets 718 which are mounted at the four corners to plate 716, engage the top and bottom surface respectively of the guide tracks 792 secured to the lines 16 and 412. To prevent lateral movement of the simplex base-threading unit 10$_{w4}$, a horizontal roller 794 mounted adjacent each pair of vertical rollers 788 and 790 (FIG. 38) engages the inner face of its respective guide track 792.

Upon energization of the motor 779 (FIG. 37), the drive gear 776 on the motor shaft 778 is rotated in clockwise direction, as viewed in FIG. 39, with attendant counterclockwise rotation of the meshing pinion 780 and the larger pinion 784 both on the shaft 782. This counterclockwise rotation of the larger pinion 784 with respect to the stationary rack 786 moves the simplex base-threading unit 10$_{w4}$ to the left, as viewed in FIGS. 37 and 39, along the guide tracks 792 between the stationary exhaust line 16 and the stationary basing line 412. At the same time the clockwise rotation of the drive gear 776 rotates the pinion 774 on the vertical shaft 770 in counterclockwise direction with attendant counterclockwise rotation of such shaft 774, the universal joints 765, intermediate shaft 766, the upper shaft 736 and the left-hand sprocket 734, as viewed in FIGS. 37 and 38.

*Orienting and feeding device*

The aforementioned vibratory-type orienting and feeding device 742 comprises a spiral conveyor feeder bowl 796 of the type shown in U.S. Patent No. 2,696,292, issued December 7, 1954, to W. V. Spurlin, which bowl 796 is provided with a helical alignment track (not shown) on its inner side wall for aligning the bases 12c in random "eyelet-up"–"eyelet-down" order. However, near the top of such alignment track, a slot (not shown) cut into said track causes the heavy-ended bases 12c (i.e. those in the "eyelet-up" position) to fall off such alignment track so that only aligned "eyelet-down" bases are fed by such feeder bowl 796 down the aforesaid arcuate inverting tube 750 to an unloading lip 800 on the aforementioned unloading platform 749.

As a base-threading head 130m (FIG. 39) moves along its prolate-cycloidal motion from position "I" through position "K" to the base-loading position "A," the base-threading jaw 136m is moved to the "open" position shown at positions "K" and "A" by engagement of its roller 751 with the first stationary cam 752, thereby permitting the other base-threading jaw 134m to become aligned with and engage the leading base 12c on the unloading platform 749 of the vibratory-type orienting and feeding device 742. The base-threading head 130m at position "A" is also aligned with an exhausted lamp 12, supported in the jaws 802 (FIGS. 37 and 38) of a stationary basing head 418 on the stationary basing line 412. Since the simplex base-threading unit 10$_{w4}$ is moving from right to left, as viewed in FIGS. 37 and 39, at a speed of V$_1$ ft./sec. and the inclined chain 732 and base-threading heads 130m are moving at the same speed but in the opposite direction, the base-threading head 130m at position "A" along its path of movement on such base-threading conveyor 72m remains relatively stationary with respect to and is aligned with such stationary exhausted lamp 12 through positions "A," "B," "C" and "D." Shortly beyond position "A," the roller 751 rolls off the cam 752 and the base-threading jaw 136m is pulled by the spring 754 into engagement with the leading base 12c on the unloading platform 749 of the vibratory-type orienting and feeding device 742 thereby securing such base 12c between the jaws 134m and 136m and permitting such base-threading head 130m at position "A" to remove said gripped base 12c from the unloading platform 749. During the path of movement of the base-threading head 130m and the base 12c along the base threading conveyor 72m from position "A" to position "C," the base 12c is axially aligned with the vertically disposed top-lead wire 12$_{w2}$.

As such base-threading head 130m (with the base 12c secured therein) moves downwardly along the inclined chain 732 during its path of movement through positions "B," "C" and "D," such base 12c is lowered over the aligned stationary top-lead wire 12$_{w2}$ of the exhausted lamp 12. Such top lead wire 12$_{w2}$ (guided by a conical aperture 804, FIG. 40) moves through the eyelet hole in the base to the position shown in FIG. 43 which final position is achieved when the base-threading head 130m is at its lowermost position "D" along its path of movement on the base threading conveyor 72m.

Once the base 12c is seated on the molded seal portion of the exhausted lamp 12 at position "D" of the base-threading head 130m, the roller 756 on the base-threading jaw 134m engages the second stationary cam 758 and such base-threading jaw 134m is moved outwardly from the positioned base 12c and exhausted lamp 12 in order to clear the latter and permit the now empty base-threading head 130m to move along its prolate-cycloidal path from position "D" through positions "E" and "F" around the righthand sprocket 734, as viewed in FIGS. 37 and 39. During this movement of the base-threading jaws 134m and 136m are closed at about position "E." As clearly shown in FIG. 39 the base-threading head 130m remains in the closed position and is inoperative with respect to the stationary exhaust line 16 (FIG. 39) through positions "F," "G," "H" and "I" on the far side of the base threading conveyor 72m.

Although a specific embodiment and alternative embodiments of the present invention have been herein shown and described, it will be understood that other modifications thereof may be made without departing from the scope of the present invention.

We claim:

1. The method of transferring articles from a first movable line of work stations to a second movable line of work stations movable at the same velocity as said first line, comprising the steps of moving a pick-up unit at the same velocity as said first movable line so that said first pick-up unit is relatively stationary with respect to said first movable line, transferring an article from said first movable line to said pick-up unit while said pick-up unit is relatively stationary with respect to said first movable line, moving a discharge unit at the same velocity as said pick-up unit during another portion of the movement of said pick-up unit so that the discharge unit and pick-up unit are relatively stationary with respect to each other, transferring the article from said pick-up unit to said discharge unit while said pick-up unit is relatively stationary with respect to said discharge unit, moving said discharge unit at the same velocity as said second movable line during another portion of the movement of said discharge unit so that said discharge unit is relatively stationary with respect to said second movable line, and transferring said article from said discharge unit to said second movable line while the discharge unit is relatively stationary with respect to said second movable line.

2. The method of transferring articles from a first movable line of work stations movable at a predetermined speed and direction to a second movable line of work stations movable at the same speed and in the opposite direction, comprising the steps of moving a pick-up unit at the same velocity as said first movable line so that first pick-up unit is relatively stationary with respect to said first movable line, transferring an article from said first movable line to said pick-up unit while said pick-up unit is relatively stationary with respect to said first movable line, moving said pick-up unit at the same velocity as said second movable line during another portion of the movement of said pick-up unit so that said pick-up unit is relatively stationary with respect to said second movable line, and transferring the article from said pick-up unit to said second movable line while said pick-up unit is relatively stationary with respect to said second movable line.

3. The method of transferring articles from a first movable line of work stations to a second movable line of work stations movable at a slower speed but in the same direction as said first movable line, comprising the steps of moving a pick-up unit along and between said movable lines, simultaneously moving said pick-up unit at a velocity to compensate for the difference in the velocities of said pick-up unit and said first movable line so that said pick-up unit is relatively stationary with respect to said first movable line, transferring an article from said first movable line to said pick-up unit while said pick-up unit is relatively stationary with respect to said first movable line, moving said pick-up unit at a velocity to compensate for the difference between the velocities of said pick-up unit and said second movable line so that said pick-up unit is relatively stationary with respect to said second movable line, and transferring said article from said pick-up unit to said second movable line while the pick-up unit is relatively stationary with respect to said second movable line.

4. A method of manufacturing a product produced by the assembly of the individual parts of the product, comprising the steps of fabricating the successive stages of the product on a plurality of successive lines of work stations, and synchronizing the transfer of the product produced by such lines so that the product produced by any one station on one line of work stations is transferred to a station on the next line of work stations before the product produced by the preceding line of work stations is transferred to said any one station on said one line of work stations.

5. The method of performing an operation on stationary articles by means of a work tool, comprising the steps of imparting to said tool a first component of velocity having a direction along said articles, simultaneously imparting to said tool a second component of velocity, a portion of the path of said tool resulting from said components being contiguous to said articles, the resultant of said first and second components in said portion being zero so that said tool is relatively stationary with respect to said articles in said portion, and performing said operation on an article by means of said tool while said tool is so relatively stationary with respect to said articles.

6. The method of performing an operation on stationary articles by means of a work tool cooperative with an article-receiving unit, comprising the steps of imparting to said tool and said article-receiving unit a first component of velocity having a direction along said articles, simultaneously imparting to said tool and said article-receiving unit a second component of velocity in a second direction, portions of the paths of said tool and of said article-receiving unit resulting from said components being contiguous to said articles, the resultant of said first and second components in said portion being zero so that in said portions said tool and said article-receiving unit are relatively stationary with respect to said articles, transferring an article to said article-receiving unit while the latter is so relatively stationary with respect to said articles, and performing said operation with said tool on said article while the latter is so supported by said article-receiving unit.

7. The method of performing an operation on stationary articles by means of a work tool, comprising the steps of imparting to said tool a first component of continuous motion at a first velocity in a first direction in a path at least a part of which is along said articles, simultaneously imparting to said tool a second component of continuous motion at a second velocity in a second direction in a path at least a part of which coincides with said part produced by said first component, the resultant of said velocities, relative to said articles during the movement of said tool as said tool approaches said coinciding path decreasing gradually to zero and said resultant during the movement of said tool in said coinciding path being zero for an appreciable time interval, and performing said operation on an article by means of said tool while said result is zero.

8. The method of transferring articles from a first stationary line of work stations to a second stationary line of work stations by means of a pick-up unit and a discharge unit, comprising the steps of imparting to said pick-up unit and to said discharge unit a first component of velocity having a direction along and between said stationary lines, simultaneously imparting to said pick-up unit a second component of velocity, said pick-up unit being moved contiguously to said first line in a first portion of the path of said pick-up unit resulting from said components, simultaneously imparting to said discharge unit a second component of velocity, said pick-up unit and discharge unit being moved contiguously to each other in second portions of the path of said pick-up unit and in a first portion of the path of said discharge resulting from said components, and said discharge unit being moved contiguously to said second line in a second portion of the path of said discharge unit resulting from the components of velocity imparted to said discharge unit, the resultant of said first and second components on said pick-up unit in the first portion of the path of said pick-up unit being zero so that in said first portion said pick-up unit is relatively stationary with respect to said first stationary line, transferring an article from said first stationary line to said pick-up unit while said pick-up unit is so relatively stationary with respect to said first stationary line, the resultant of said components in said pick-up unit in said second portion of the path of said pick-up unit being equal to the resultant of said components on said discharge units in the first portion of the path of said discharge unit so that said discharge unit and pick-up unit are relatively stationary with respect to each other in said last-named portions of said paths, transferring said articles from said pick-up unit to said discharge unit while said pick-up unit is so relatively stationary with respect to said discharge unit, the resultant of said components on said discharge unit in said second portion of the path of said discharge unit being zero so that said discharge unit is relatively stationary with respect to said second stationary line in said last-named second portion, and transferring said article from said discharge unit to said second stationary line while said discharge unit is so relatively stationary with respect to said second stationary line.

9. The method of transferring articles from a stationary line of work stations to a movable line of work stations by means of a pick-up unit, comprising the steps of imparting to said pick-up unit a first velocity component having a direction along and between said lines, simultaneously imparting to said pick-up unit a second velocity component, a first portion of the path of said pick-up unit resulting from said components being contiguous to said stationary line and the resultant velocity of said pick-up unit in said first portion being zero so that said pick-up unit is relatively stationary with respect to said stationary line, transferring an article from said stationary line to said pick-up unit while said pick-up unit is so relatively stationary with respect to said stationary line, a second portion of the path of said pick-up unit resulting from said components being contiguous to said movable line, the resultant of said components in said second portion being the same as the velocity of said movable line so that said pick-up unit is relatively stationary with respect to said movable line, and transferring said article from said pick-up unit to said movable line while the pick-up unit is so relatively stationary with respect to said movable line.

10. The method of transferring articles from a first work station to a second work station in a stationary line of such work stations by means of a pick-up unit, comprising the steps of imparting to said pick-up unit a first velocity component having a direction along said line and a predetermined magnitude, simultaneously imparting to said pick-up unit a second velocity component which has different directions in different portions of the path of said pick-up unit, a portion of the path of said pick-up unit resulting from said components being contiguous to said first station and the resultant of said first and second components being zero in said portion so that said pick-up unit is relatively stationary with respect to said first work station in said portion, transferring an article from said first work station to said pick-up unit while said pick-up unit is so relatively stationary with respect to said first work station, a portion of the path of said pick-up unit resulting from said components being contiguous to said second station and said resultant being zero along said second portion so that said pick-up unit is relatively stationary with respect to said second work station in said second portion, and transferring said article from said pick-up unit to said second work station while the pick-up unit is so relatively stationary with respect to said second work station.

11. The method of transferring articles from a stationary line of work stations to a movable article-receiving unit, comprising the steps of imparting to said article-receiving unit a first velocity component having a direction along said articles, simultaneously imparting to said article-receiving unit a second velocity component, a portion of the path of movement of said unit resulting from said components being contiguous to said articles and the resultant of said components being zero in said portion so that said article-receiving unit is relatively stationary with respect to said articles, and transferring an article to said article-receiving unit while the latter is so relatively stationary with respect to said articles.

12. The method of transferring articles from a first movable line of work stations to a second movable line of work stations movable at the same velocity as the first movable line, by means of a pick-up unit and a discharge unit, comprising the steps of imparting a first velocity component to said pick-up unit and discharge unit said component having a direction along said lines and magnitude independent of the magnitude of the velocity of the movable lines, simultaneously imparting to said pick-up unit a second component of velocity, a first portion of the resulting path of said pick-up unit being contiguous to said first line and said second component compensating for the difference in the magnitudes of the velocities of said first movable line and said pick-up unit in said portion so that said pick-up unit is relatively stationary with respect to said first movable line in said portion, transferring an article from said first movable line to said pick-up unit while said pick-up unit is so relatively stationary with respect to said first movable line, a second portion of the resulting path of said pick-up unit being contiguous to said discharge unit, imparting to said discharge unit a second component of velocity, the resultant of said first and second components on said discharge unit in said second portion being a velocity having the same magnitude and direction as said pick-up unit, so that the discharge unit and pick-up unit are relatively stationary with respect to each other, transferring the article from said pick-up unit to said discharge unit while said discharge unit is so relatively stationary with respect to said pick-up unit, a second portion of the path of said discharge unit resulting from said components of velocity imparted to said discharge unit being contiguous to said second line and said last-named second velocity component compensating for the difference in the magnitudes of the velocities of said second line and said discharge unit in said last-named second portion so that said discharge unit is relatively stationary with respect to said second movable line in said second portion, and transferring said article from said discharge unit to said second movable line while the discharge unit is so relatively stationary with respect to said second movable line.

13. The method of transferring articles from a first line of work stations to a second line of work stations with a pick-up assembly having pick-up means comprising the steps of moving said assembly along and between said lines at a first velocity, simultaneously moving said pick-up means relative to said assembly at a second velocity, a first portion of the path of movement of said means resulting from said movements being along said first line and a second portion of the path of movement of said means resulting from said movements being along said second line, the resultant of said first and second velocities along said first portion being such that said means is at rest relative to said first line along said first portion, the resultant of said first and second velocities along said second portion being such that said means is at rest relative to said second line, transferring said articles from said first line to said pick-up means while said pick-up means is in said first portion, and transferring said article from said pick-up means to said second line while said pick-up means is in said second portion.

14. The method of performing an operation on articles in a line which may be at rest or may have a velocity by means of operating means which comprises imparting to said operating means a generally translational motion along said line and a simultaneous generally circling motion around an endless path, said operating means periodically passing generally parallel and contiguous to said line periodically in said circling motion, the resultant of the velocity of said translational motion and the velocity of said circling motion being equal to the velocity of said line when said operating means is so parallel and contiguous to said path, and performing said operation while said resultant and said velocity of said line are equal.

References Cited in the file of this patent

UNITED STATES PATENTS

| | | |
|---|---|---|
| 1,651,834 | Novick | Dec. 6, 1927 |
| 1,907,532 | Flaws | May 9, 1933 |
| 2,049,915 | Lewis | Aug. 4, 1936 |
| 2,447,559 | Bloemers | Aug. 24, 1948 |
| 2,611,493 | Nordquist | Sept. 23, 1952 |
| 2,721,584 | Midgley et al. | Oct. 25, 1955 |
| 2,834,393 | Cihlar et al. | May 13, 1958 |
| 2,855,016 | Crosby et al. | Oct. 7, 1958 |
| 2,866,534 | Carter | Dec. 30, 1958 |
| 2,889,027 | Diodate | June 2, 1959 |
| 2,944,688 | Jeremiah | July 12, 1960 |
| 2,960,205 | Gardner et al. | Nov. 15, 1960 |
| 2,993,516 | Davison et al. | July 25, 1961 |